United States Patent [19]

Kurahayashi et al.

[11] 4,193,097
[45] Mar. 11, 1980

[54] FACSIMILE APPARATUS

[75] Inventors: Sadasuke Kurahayashi, Tokyo; Yuzo Kato, Yokohama; Shin Tsuda, Hasuda; Hakaru Muto, Kamakura; Asao Watanabe, Higashi Kurume, all of Japan

[73] Assignee: Canon Kabushiki Kaisha, Tokyo, Japan

[21] Appl. No.: 899,724

[22] Filed: Apr. 25, 1978

[30] Foreign Application Priority Data

Apr. 30, 1977 [JP] Japan .................................. 52-50241
Jun. 21, 1977 [JP] Japan .................................. 52-73514

[51] Int. Cl.² ........................................... H04N 7/12
[52] U.S. Cl. ................................................ 358/261
[58] Field of Search .............................. 358/260, 261

[56] References Cited

U.S. PATENT DOCUMENTS

| | | | |
|---|---|---|---|
| 2,909,601 | 10/1959 | Fleckenstein et al. | 358/261 |
| 2,922,840 | 1/1960 | Lally | 358/260 |
| 2,956,115 | 10/1960 | Hefele | 358/260 |
| 2,990,450 | 6/1961 | Treuhaft | 358/260 |
| 3,847,732 | 11/1974 | Perreault | 358/261 |

*Primary Examiner*—Robert L. Griffin
*Assistant Examiner*—Joseph A. Orsino, Jr.
*Attorney, Agent, or Firm*—Fitzpatrick, Cella, Harper & Scinto

[57] ABSTRACT

This invention relates to the reduction in time required for signal transmission in facsimile apparatus, and consists of a transmitting apparatus adapted for eliminating the signal indicating the line thickness from the binary image signal obtained by scanning the original to be transmitted and transmitting thus obtained band-compressed transmission signal, and a receiving apparatus adapted for adding a signal approximately equal to the above-mentioned signal indicating the line thickness to the above-mentioned transmission signal thereby forming received image.

9 Claims, 39 Drawing Figures

FIG. IA
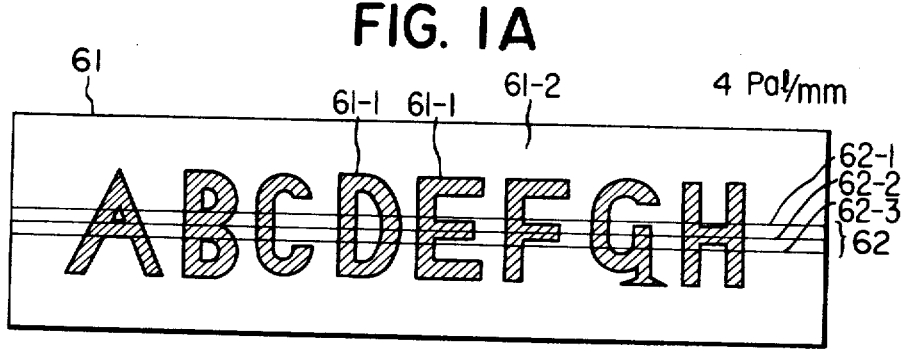
FIG. IB
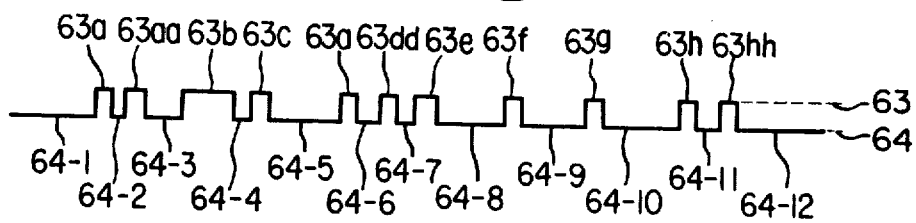
FIG. IC
W15, B3, [W2], [B4], W6, B9, W3, B3, W12, B3, W4, B3, [W3], [B4], W11, B3, W11, B3, W13, B3, W4, B3, W15,  TOTAL 140 BITS
FIG. ID
110110, 010, 001, 011, 1001, 110000, 010, 010, 110011, 010, 011, 010, 010, 011, 110010, 010, 110010, 010, 110100, 010, 011, 010, 110110,  TOTAL 91 BITS
FIG. IE
W15, [W2], W6, B9, W3, W12, W4, [W3], W11, W11, W13, W4, W15,
FIG. IF
*0110110, 0001, 0001, 1110000, *0010, 0110011, *0011, *0010, *0110010, *0110010, *0110100, *0011, *0110110   TOTAL 74 BITS

FIG. 2

| BLACK OR WHITE RUN LENGTH | CODE | | CODE TABLE | CNT | CNT 2 |
|---|---|---|---|---|---|
| | ADDRESSES | REMAINDER | | | |
| 1 | 0 | 00 | 3 | 1 | X |
| 2 | 0 | 01 | 3 | | |
| 3 | 0 | 10 | 3 | | |
| 4 | 0 | 11 | 3 | | |
| 5 | 10 | 00 | 4 | 2 | 4 |
| 6 | 10 | 01 | 4 | | |
| 7 | 10 | 10 | 4 | | |
| 8 | 10 | 11 | 4 | | |
| 9 | 110 | 000 | 6 | 3 | 8 |
| 10 | 110 | 001 | 6 | | |
| ⋮ | ⋮ | ⋮ | ⋮ | | |
| 15 | 110 | 110 | 6 | | |
| 16 | 110 | 111 | 6 | | |
| 17 | 1110 | 0000 | 8 | 4 | 16 |
| 18 | 1110 | 0001 | 8 | | |
| ⋮ | ⋮ | ⋮ | ⋮ | | |
| 32 | 1110 | 1111 | 8 | | |
| 33 | 11110 | 00000 | 10 | 5 | 32 |
| ⋮ | ⋮ | ⋮ | ⋮ | | |
| 64 | 11110 | 11111 | 10 | | |
| 65 | 111110 | 000000 | 12 | 6 | 64 |
| ⋮ | ⋮ | ⋮ | ⋮ | | |
| 128 | 111110 | 111111 | 12 | | |
| 129 | 1111110 | 0000000 | 14 | 7 | 128 |
| ⋮ | ⋮ | ⋮ | ⋮ | | |
| 256 | 1111110 | 1111111 | 14 | | |
| 257 | 11111110 | 00000000 | 16 | 8 | 256 |
| ⋮ | ⋮ | ⋮ | ⋮ | | |
| 512 | 11111110 | 11111111 | 16 | | |
| 513 | 111111110 | 000000000 | 18 | 9 | 512 |
| ⋮ | ⋮ | ⋮ | ⋮ | | |
| 1024 | 111111110 | 111111111 | 18 | | |
| 1025 | 1111111110 | 0000000000 | 19 | 10 | 1024 |
| ⋮ | ⋮ | ⋮ | ⋮ | | |
| 1152 MARGIN | 1111111110 | 0001111111 1111111111 | 19 19 | | |

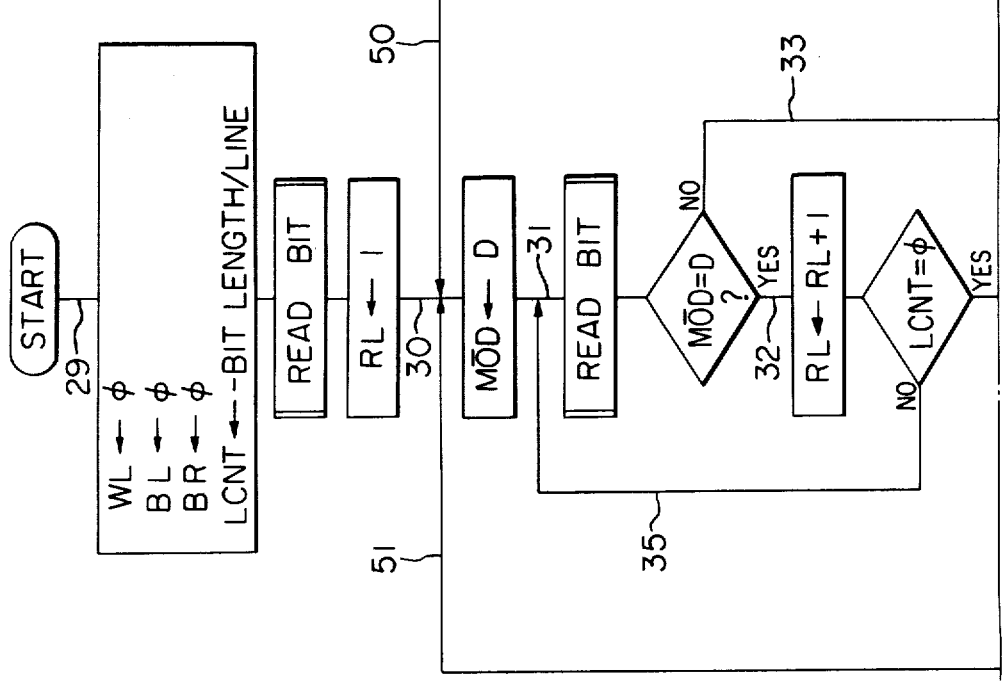

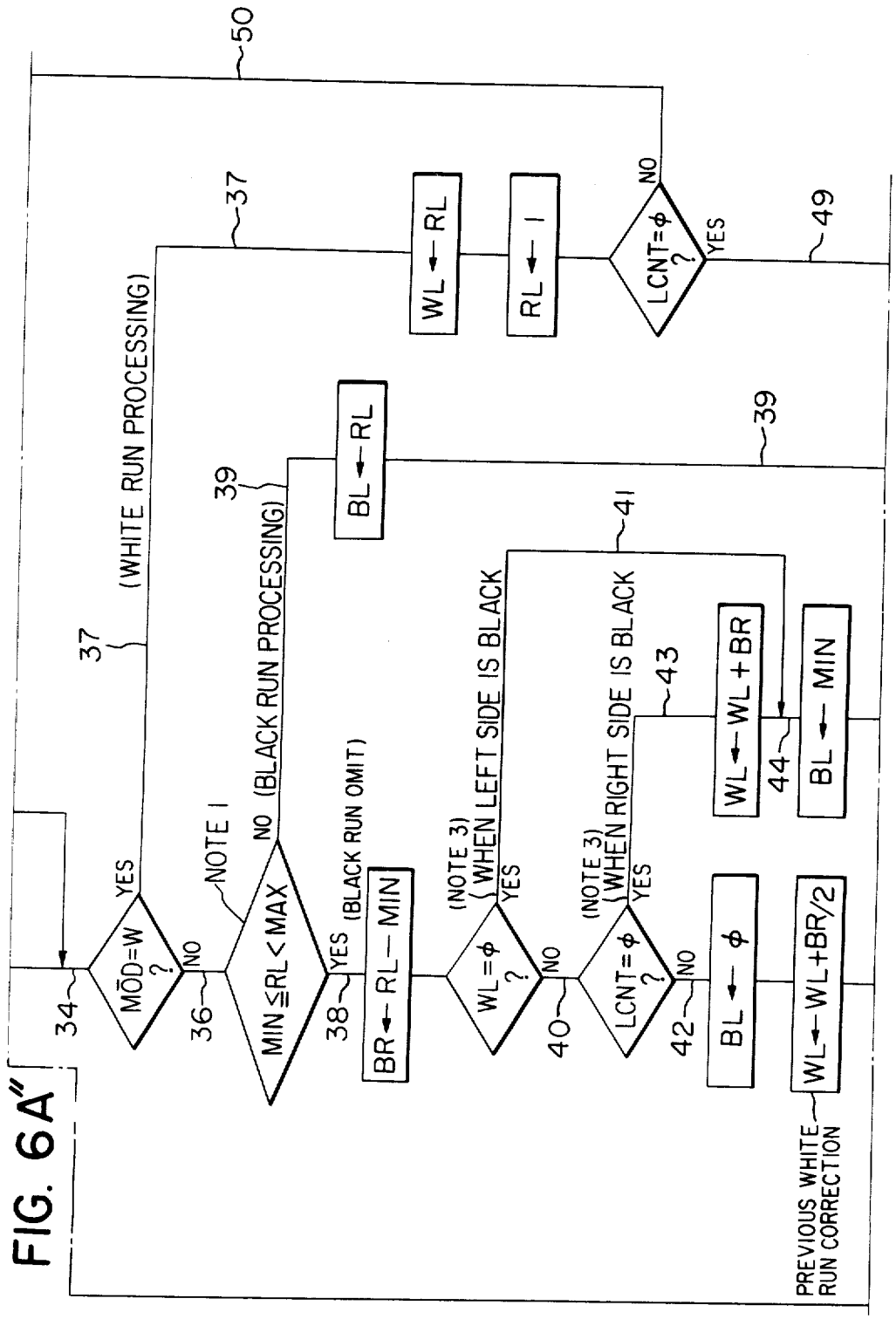

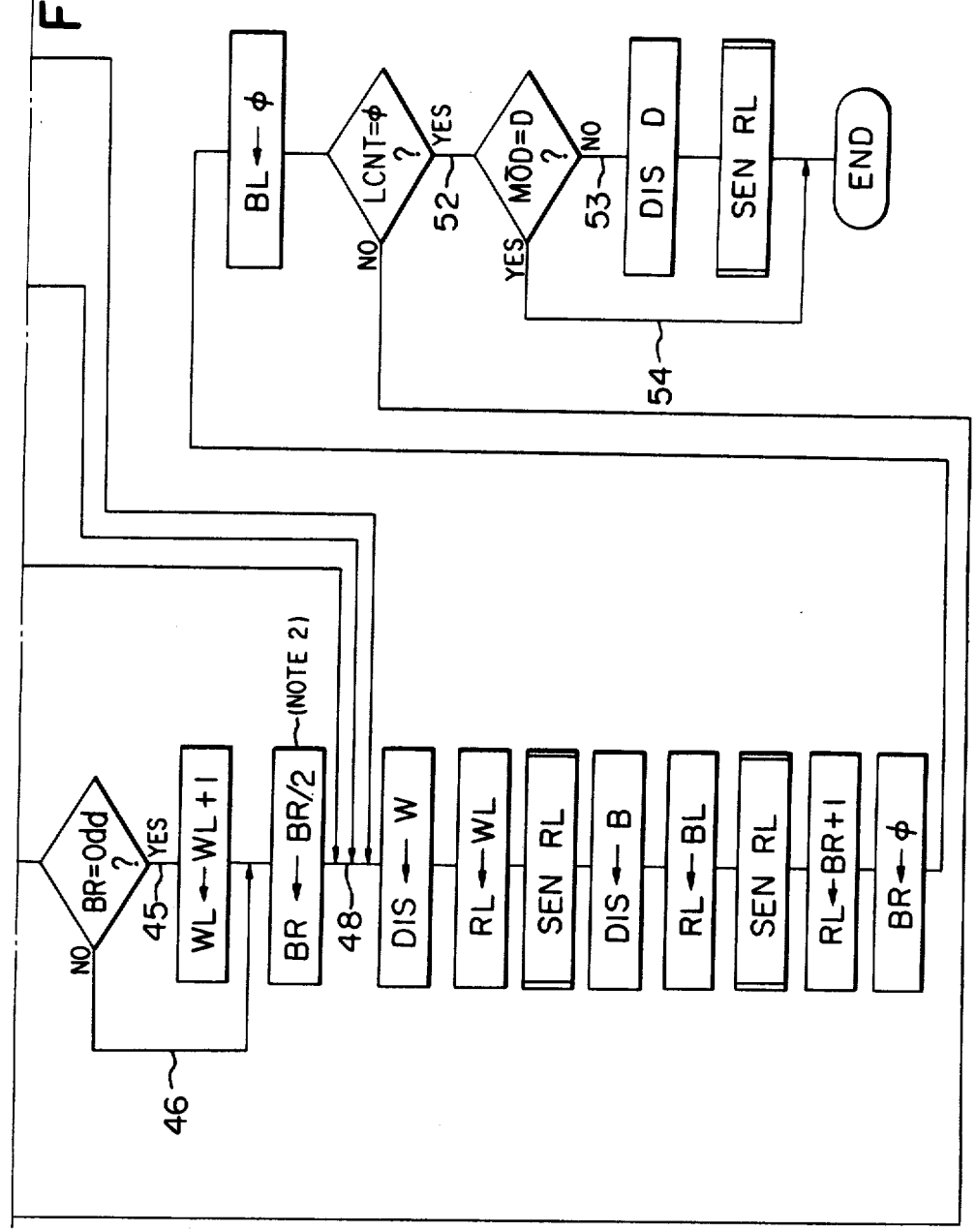

| (16 BITS/LINE) |
|---|
|  |
| 48-52-53<br>36-38-48-44-48-52-53<br>36-39-48-52-53 |
| 49-48-52-54<br>32-35)-34-37-49-48-52-54<br>34-37-49-48-52-54<br>30-(31-32-35)-34-37-49-48-52-54<br>40-42-46-47-48-51- 30-(31-32-35)-34-37-49-48-52-54<br>48-51-30-(31-32-35)-34-37-49-48-52-54 |
| 49-48-52-53<br>32-35)-33-34-37-49-48-52-53<br>33-34-37-49-48-52-53 |
| 38-40-43-44-48-52-54<br>37-50-30-(31-32-35)-34-36-38-40-43-44-48-52-54<br>32 35)-33-34-37-50-30-(31-32-35)-34-36-38-40-43-44-48-52-54<br>33-34-37-50-30-(31-32-35)-34-36-38-40-43-44-48-52-54 |
| 39 48 52 54<br>37-50-30-(31-32-35)-34-36-39-48-52-54<br>32-35) 33 34 37 50 30-(31 32 35) 34 36 39 48 52 54<br>40 42 45 47 48 51 30-(31 32 35) 34 37 49 48 52 54 |

FIG. 7A

| BINARY IMAGY SIGNAL | | | PATH    ( ): REPEAT |
|---|---|---|---|
| TOTAL WHITE (W16) | | | 29-30-(31-32-35)-34-37-49-48-52-54 |
| TOTAL BLACK (B16) | | | 29-30-(31-32-35)-34-36-39-48-52-54 |
|  | B15 | W1 | 29-30-(31-32-35)-33-36-39-48-52-53 |
| W14 | B1 | W1 | 29-30-(31-32-35)-33-34-37-50-30-31-33-34-36-39- |
| W12 | B3 | W1 | 29-30-(31-32-35)-33-34-37-50-30-(31-32-35)-33-34- |
| W6 | B9 | W1 | 29-30-(31-32-35)-33-34-37-50-30-(31-32-35)-33-34- |
|  | B1 | W15 | 29-30-31-33-34-36-39-48-51-30-(31-32-35)-34-37- |
|  | B3 | W13 | 29-30-(31-32-35)-33-34-36-38-41-44-48-51-50-(31- |
|  | B9 | W7 | 29-30-(31-32-35)-33-34-36-39-48-51-30-(31-32-35)- |
| W1 | B1 | W14 | 29-30-31-33-34-37-50-30-31-33-34-36-39-48-51- |
| W1 | B3 | W12 | 29-30-31-33-34-37-50-30-(31-32-35)-33-34-36-38- |
| W1 | B9 | W6 | 29-30-31-33-34-37-50-30-(31-32-35)-33-34-36-39- |
|  | W15 | B1 | 29-30-(31-32-35)-33-34-37-49-48-52-53 |
| B1 | W14 | B1 | 29-30-31-33-34-36-39-48-51-30-(31-32-35)-34-37- |
| B3 | W12 | B1 | 29-30-(31-32-35)-33-34-36-38-41-44-48-51-30-(31- |
| B9 | W6 | B1 | 29-30-(31-32-35)-33-34-36-39-48-51-30-(31-32-35)- |
|  | W13 | B3 | 29-30-(31-32-35)-33-34-37-50-30-(31-32-35)-34-36- |
| B1 | W12 | B3 | 29-30-31-32-34-36-39-48-51-30-(31-32-35)-33-34- |
| B3 | W10 | B3 | 29-30-(31-32-35)-33-34-36-38-41-44-48-51-30-(31- |
| B9 | W4 | B3 | 29-30-(31-32-35)-33-34-36-39-48-51-30-(31-32-35)- |
|  | W7 | B9 | 29-30-(31-32-35)-33-34-37-50-30-(31-32-35)-34-36- |
| B1 | W6 | B9 | 29-30-31-33-34-36-39-48-51-30-(31-32-35)-33-34- |
| B3 | W4 | B9 | 29-30-(31-32-35)-33-34-36-38-41-44-48-51-30-(31- |
| W1 | B4 | W11 | 29-30-31-33-34-37-50-30-(31-32-35)-33-34-36-38- |

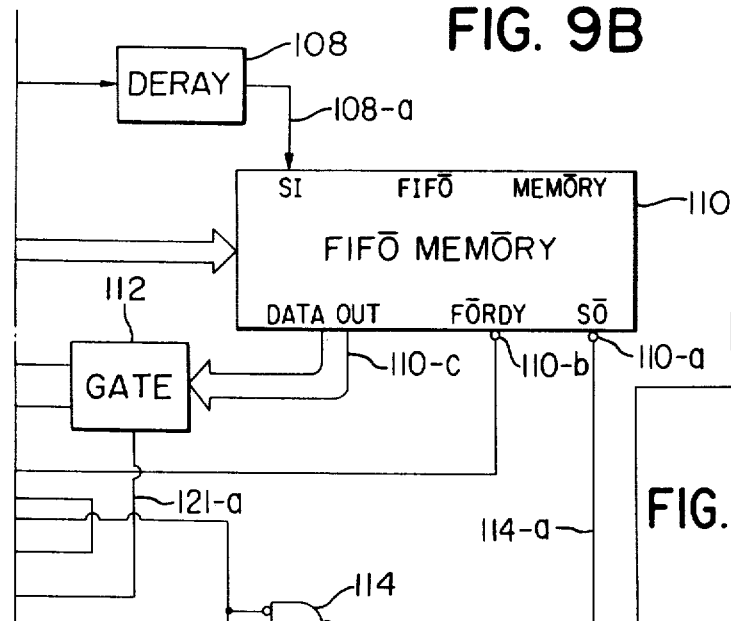
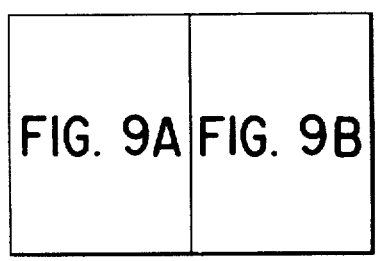
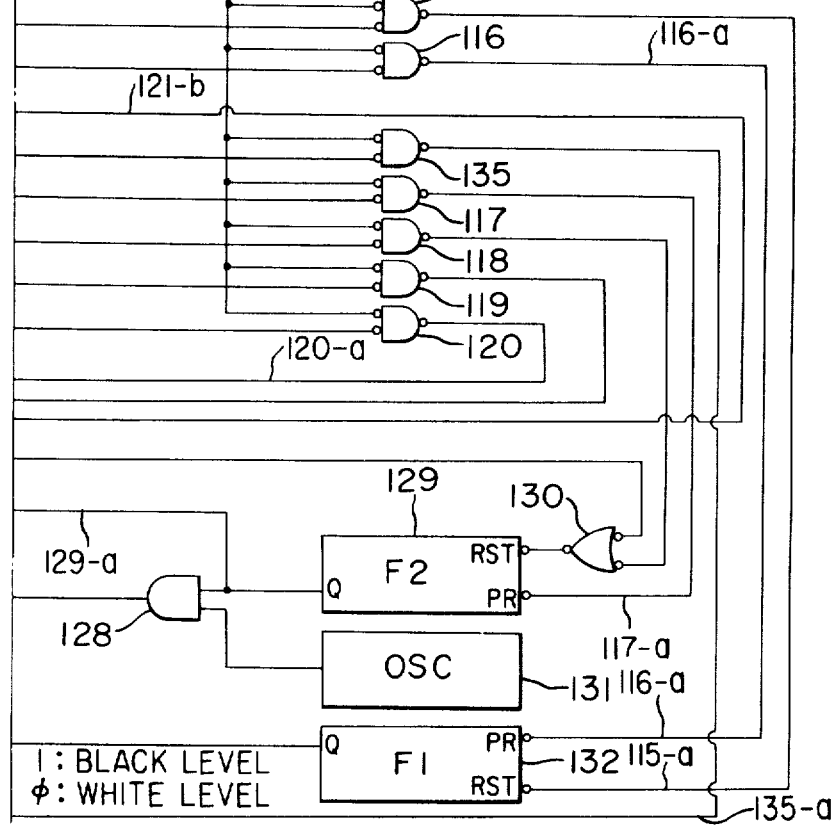
FIG. 9B
FIG. 9

FIG. 11A
| | ADDRESS (HEXADECIMAL) | MEMORY CONTENTS (8 BITS) | |
|---|---|---|---|
| R O M | ɸɸɸ | | PROGRAM AREA |
| | ɸɸ1 | | |
| | ⋮ | ⋮ | |
| | 7FF | | |
137
FIG. 11B
| | ADDRESS | CONTENTS | | |
|---|---|---|---|---|
| R A M | 8ɸɸ | CNT | 144 | RAM AREA |
| | 8ɸ1 | BCNT | 145 | |
| | 8ɸ2 | LCNT | 146 | |
| | 8ɸ3 | | | |
| | 8ɸ4 | REG | 147 | |
| | 8ɸ5 | | | |
| | 8ɸ6 | | | |
| | 8ɸ7 | | | |
| | 8ɸ8 | | | |
| | ⋮ | | | |
| | 8FF | | | |
138
FIG. 11C
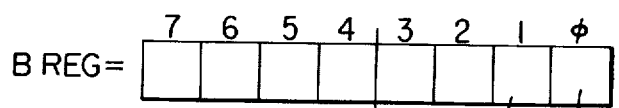
FIG. 11D
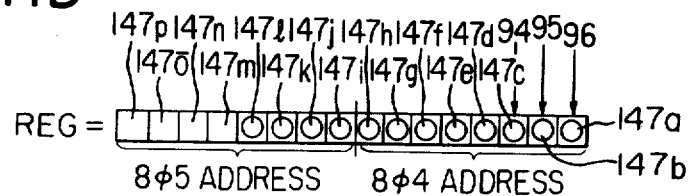
FIG. 11E
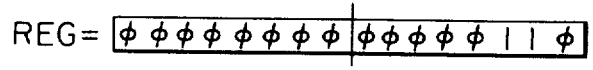

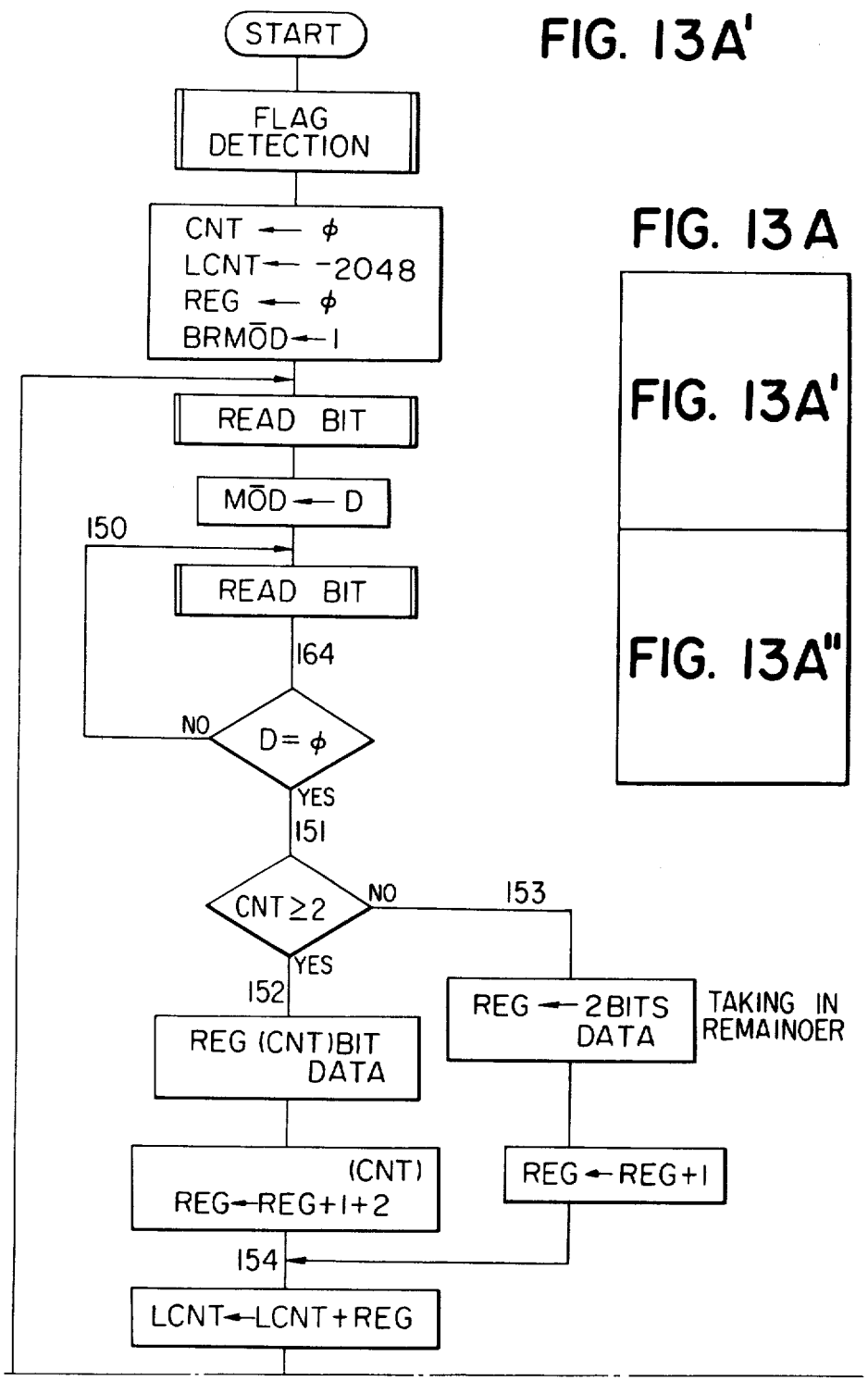

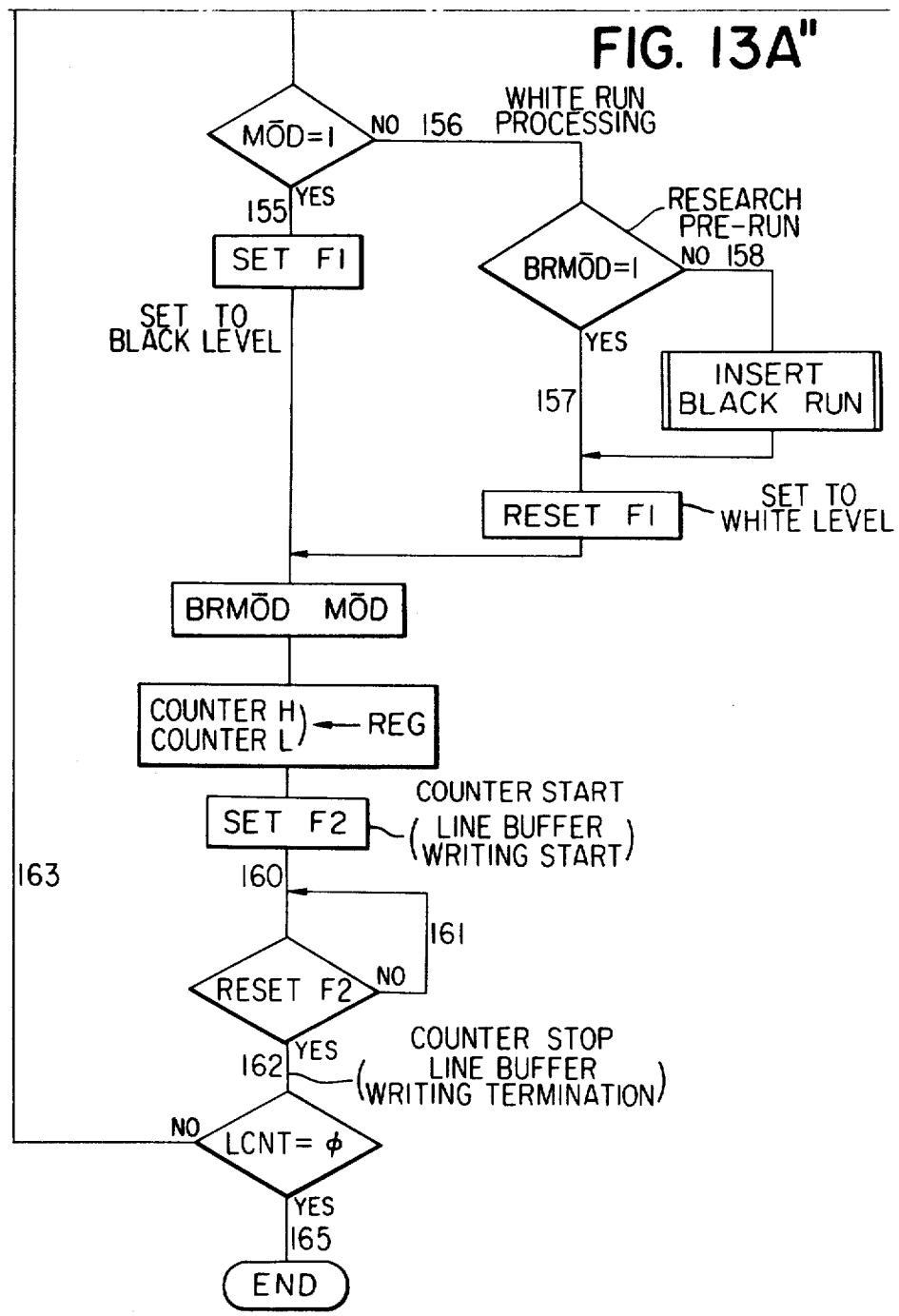

FACSIMILE APPARATUS

BACKGROUND OF THE INVENTION

1. Field of the Invention

The present invention relates to a facsimile apparatus wherein signal transmission is conducted after information redundancy is eliminated from the information obtained by scanning the original to be transmitted, and the received image is formed by adding an arbitrary signal to thus transmitted signal.

2. Description of the Prior Art

Though the conventional facsimile apparatus have been designed for the transmission of images in general, their actual use is principally limited to the transmission of letters and symbols (hereinafter collectively referred to as characters) on documents and business forms. In such cases what is actually transmitted is the character information rather than the image itself. For example, as a bold-lined character "A" and a fine-lined character "A" both represent a same character "A", it is enough for the receiver of information as long as the meaning of character is understandable. Since the binary image signal obtained from the original to be transmitted generally contains line-width signal indicating bold or fine characters, there is required, in conventional facsimile apparatus, a certain time for transmitting said line-width signal, which results in a longer total transmission time, leading to a higher charge for the transmission line and to an inevitably lower efficiency of use of transmission telephone line. For this reason there has been a demand for a facsimile apparatus with a shorter transmission time.

SUMMARY OF THE INVENTION

The object of the present invention is to reduce the time required for transmission by partly or wholly eliminating one signal from the binary image signals representing two brightness levels and obtained by scanning the original to be transmitted, and to further reduce said transmission time by partly or wholly eliminating said one signal after a thinning treatment to render uniform the time during which said one signal is continued.

An another object of the present invention is to prevent the deterioration of image quality by adding an identification signal for enabling identification of said one signal from the other signal and by adding, at the signal reception, a signal approximately equal to said eliminated signal.

BRIEF DESCRIPTION OF THE DRAWINGS

FIG. 1A is a plan view of an original principally containing characters;

FIG. 1B shows binary image signals obtained by scanning the original shown in FIG. 1A;

FIG. 1C shows the word representations of the binary image signals shown in FIG. 1B;

FIG. 1D shows the transmission codes obtained by compression treatment on the abbreviations shown in FIG. 1C;

FIG. 1E shows the word representations obtained by a signal conversion B on the words shown in FIG. 1C;

FIG. 1F shows the transmission codes obtained by compression treatment on the words shown in FIG. 1E and by attaching identification codes on the code heads;

FIG. 2 is a coding table according to Wyle coding method;

FIG. 6A shows an assembly of FIGS. 6A'-6A''';

FIG. 6A'-6A''' is a flow chart indicating the information processing to be conducted in the controller;

FIG. 11A is a memory map in the ROM;

FIG. 11B is a memory map in the RAM;

FIG. 11C is a memory map in the register B;

FIG. 11D is a memory map in the register;

FIG. 11E is a memory map when the data are stored in the register;

FIG. 13A is a flow chart of the signal conversion routine;

DESCRIPTION OF THE PREFERRED EMBODIMENT

Though the facsimile apparatus have been designed for transmission of image in general, their actual use if mainly limited to the transmission of letters and symbols (hereinafter collectively referred to as characters) appearing on the documents or business forms. In such case what is actually transmitted is the character information rather than the image itself. For example, as a bold-lined letter "A" and a fine-lined "A" both represent a same letter "A", it is enough for the receiver of information as long as the meaning of character is understandable. Since the binary image signal obtained from the original to be transmitted generally contains line-width signal indicating bold or fine characters, there is required a time for transmitting said line-width signal. Thus it is possible to reduce the transmission time for such binary image signal if said line-width signal is eliminated therefrom. Therefore, in case of transmitting an original principally consisting of character information such as aforementioned documents or business forms, it is more advantageous to rapidly transmit the meaning of said character information by sending the information indicating the position of each portion of said character information and the length thereof rather than to transmit the binary image information obtained from said original with full details in a longer time. In fact the character information is defined by said position and length of said each portion, while bold or fine characters can be obtained by an arbitrary width to said character information. Thus it becomes possible to obtain, at the receiver side, a received image approximately equal to that of the original by inserting, into the determined positions, a signal approximately equal to the above-mentioned eliminated line-width signal. The facsimile apparatus of the present invention consists of a transmitting apparatus and a receiving apparatus utilizing the above-mentioned feature, wherein the binary image signal obtained by scanning of the original to be transmitted is subjected to the elimination of a part or the whole of said line-width signal (black run A2 to be explained later), then subjected to a conventional compression process (for example one-dimensional run length coding process by Wyle coding to be explained later) whereby the further advanced compression obtained in this manner than in the conventional compression process enabling a further reduction in the transmission time, and is subjected, at the reception of thus transmitted signals, to the addition of a line-width signal of an arbitrary width (black run Ab to be explained later) in the position of the above-mentioned eliminated line-width signal thereby forming the received image.

Figure 1G:
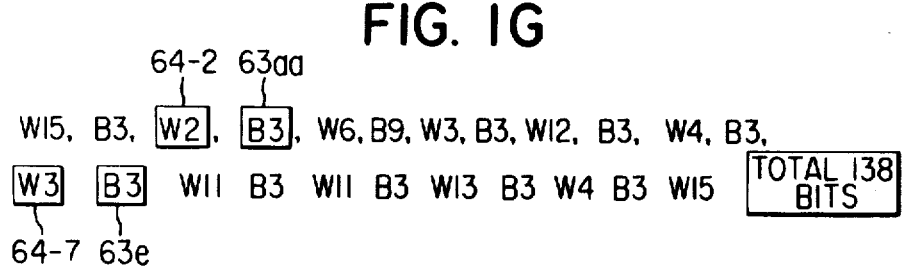
FIG. 1G shows the words representations obtained by reconverting the received transmission codes of FIG. 1F to the words of FIG. 1E and by adding black runs Ab between the successive white runs.

FIG. 1A illustrates the scanning method of the original while FIGS. 1B to 1J illustrate, in succession, the procedure of compression of the binary image signal obtained by said scanning.

At first referring to FIG. 1A, 61 is an example of the original consisting principally of characters, and 62 is a group of scanning lines.

The scanning along the scanning lines 62-1, 62-2 and 62-3 constituting said group is conducted from the left-hand end to the right-hand end, at first along the scanning line 62-1, then along the line 62-2 and then along the line 62-3, and the scanning is continued in a similar manner along the unrepresented ensuing scanning lines. FIG. 1B shows the binary image signal obtained by the scanning along the above-mentioned scanning line 62-1, wherein the signal corresponding to the black portions 61-1 etc. is represented by a black level 63 while the signal corresponding to the white portions 61-2 is represented by a white level 64, thus representing two brightness levels.

Upon start of the scanning from the left-hand end along the scanning line 62-1, there are obtained black runs 63a, 63aa belonging to said black level 63 corresponding to the character A. Successively there are obtained, in a similar manner, a black run 63b at the character B, a black run 63c at the character C, black runs 63d, 63dd at the character D, a black run 63e at the character E, a black run 63f at the character F, a black run 63g at the character G, and black runs 63h, 63hh at the character H. Between said black runs there exist white runs belonging the white level which are referred to 64-1, 64-2, ..., 64-12 from the left-hand end. The amounts of information (number of bits) and the corresponding word representations of the above-mentioned black runs 63a–63hh and white runs 64-1, to 64-12 are shown in the following Table 1.

Table 1

| Black run | Bits | Word | White run | Bits | Word |
|---|---|---|---|---|---|
| 3a | 3 | B3 | 4-1 | 15 | W15 |
| 3aa | 4 | B4 | 4-2 | 2 | W2 |
| 3b | 9 | B9 | 4-3 | 6 | W6 |
| 3c | 3 | B3 | 4-4 | 3 | W3 |
| 3d | 3 | B3 | 4-5 | 12 | W12 |
| 3dd | 3 | B3 | 4-6 | 4 | W4 |
| 3e | 4 | B4 | 4-7 | 3 | W3 |
| 3f | 3 | B3 | 4-8 | 11 | W11 |
| 3g | 3 | B3 | 4-9 | 11 | W11 |
| 3h | 3 | B3 | 4-10 | 13 | W13 |
| 3hh | 3 | B3 | 4-11 | 4 | W4 |
|  |  |  | 4-12 | 15 | W15 |

Thus the total amount of information in the above-mentioned signal, which is equal to the sum of numbers of bits in said black runs and white runs, is 140 bits. FIG. 1C shows the words in Table 1 arranged, from left to right, in the order of scanning shown in FIG. 1B, wherein each word contains a letter B or W to denote black run or white run, respectively, said letter being followed by a number indicating the number of bits contained in said run thereby providing an easily recognizable representation of aforementioned binary image signal.

FIG. 1D shows the transmission codes obtained by subjecting said words shown in FIG. 1C to the aforementioned compression process (one-dimensional run length coding according to the Wyle coding), wherein the one-dimensional run length coding means a band compression method of reducing the total number of bits by coding the length during which said black or white run continues (hereinafter referred to as run length) in said image signal with a binary code, and the Wyle coding means a coding method for image signal according to FIG. 2. Although there are known other coding methods such as Huffman coding or Golomb coding, detailed explanations will be omitted in the present specification.

Thus, in FIG. 1D, the code 110110 appearing at the upper left end corresponds to the word W15 appearing at the upper left end in FIG. 1C, and succeeding code 010 in FIG. 1D corresponds to the succeeding word B3 in FIG. 1C, the remaining codes and words mutually corresponding in this manner. Stated differently the codes 110110, 010, ... in FIG. 1D are obtained by coding, respectively, the words W15, B3, ... in FIG. 1C. Now there will be given a further explanation on the Wyle coding. In this coding method, as shown in FIG. 2, each code is composed of an address (a code defining the code length and bias) followed by a reminder (a code defining the run length). For example the code for aforementioned black run 63a (word B3) which is of 3 bits can be obtained from the right-hand columns corresponding to the row "3" in the column "white or black run length", and is therefore "010" in which the address is "0" and the reminder is "10". Similarly a 10-bit run is coded as "110001", and a 15-bit run (for example the above-mentioned word W15) is coded as "110110". In this manner the words (binary image signal) in FIG. 1C can be converted into the transmission codes shown in FIG. 1D. (It is to be further noted that, in the Wyle coding employed in the present invention, the address for a run length of 1025-1152 bits and for margin is rendered 10 bits by adding "0" to the right-hand end of the address.)

The total amount of information in said transmission code converted by the above-mentioned Wyle coding can be counted by the total number of "0" and "1" contained therein. Consequently the total amount of information in FIG. 1D is 91 bits which is compressed in comparison with 140 bits in FIG. 1C. The compression ratio, which is expressed by the ratio of number of bits in one line to number of bits after compression, is 140/91=1.54.

The transmission codes shown in FIG. 1D do not require identification signals for identifying the white runs and black runs, since the leading block (110110 appearing at the upper left end) is always regarded as a white run, and the white and black runs regularly alternates. Thus, by electrically transmitting the transmission codes shown in FIG. 1D, it is possible, at the receiver apparatus, to identify the number of bits in each code in FIG. 1D thereby restoring the words in FIG. 1C, then to restore the binary image signal if FIG. 1B according to said identification, and to produce, according to said signal, an image which is identical to that shown in FIG. 1A.

For the purpose of clarity the above-explained conversion from the words of FIG. 1C (binary image signal) to the codes of FIG. 1D will be referred to the signal conversion A, which belongs to a prior coding technology.

As the characters contained in FIG. 1A are composed of lines of a substantially constant width, the number of bits in aforementioned black runs vary according to the direction or inclination of said lines. Thus said black runs can be classified into relatively short black runs (black run Aa) representing vertical or diagonal lines, and relatively long black runs (black run Ba) representing horizontal lines. By taking an upper threshold value of 9 bits and a lower threshold value of 3 bits, and defining a black run Aa as having less than 9 bits but 3 or larger bits, and a black run Ba as any other black runs (those having less than 3 bits or having 9 or larger bits), the words B3 and B4 in FIG. 1C are defined as a black run Aa while the word B9 is defined as a black run Ba.

FIG. 1E shows the words obtained by eliminating the black runs Aa from the entire information shown in FIG. 1C consisting of black runs and white runs. FIG. 1E therefore contains white runs in directly adjacent positions for example W15 and W2.

FIG. 1F shows the codes obtained by the aforementioned Wyle coding of the words shown in FIG. 1E and by attaching to each code, an identification bit (*0 or *1) respectively representing a white run or black run. The insertion of said identification codes is made because of the necessity to identify the white runs and black runs Ba resulting from the selective elimination of black runs Aa. Thus the amount of information of the transmission codes of FIG. 1F is 74 bits, said identification bits inclusive.

When the transmission codes of FIG. 1F are electrically transmitted, the receiver apparatus at first identifies, by means of said identification bits, if each code block (for example *0110110) represents a white run length or a black run length Ba, then conduct decoding to determine the length of each run thereby restoring the words of FIG. 1E and, in case of two consecutive white runs, inserts therebetween a black run Ab, which is a black run of an arbitrary length, for example 3 bits, inserted at the receiver as a substitute for the black run Aa, thus forming the words shown in FIG. 1G. Said inserted black runs Ab are of a suitably predetermined run length, corresponding to the line width on the received image which is practically in the order of 0.5 mm in consideration of line width in ordinary originals, whereby the black runs Aa before transmission being replaced by the black runs Ab at the receiver. More specifically, the black runs Aa in the image signal shown in FIGS. 1B and 1C, consisting of B3 runs (63a, 63c, 63d, 63dd, 63f, 63g, 63h, 63hh) and B4 runs (63ee, 63e) before the transmission are transformed, because of the insertion of the black runs Ab, into uniform black runs B3 (63a, 63aa, 63c, 63d, 63dd, 63e, 63f, 63g, 63h, 63hh) as shown in FIG. 1G. Thus, in this case, upon electrical transmission of the transmission codes of FIG. 1F, the receiver apparatus at first identifies if each received code represents white or black run and also identifies the run length to restore the words of FIG. 1E, then inserts the above-mentioned black runs Ab between the consecutive white runs in thus identified signals to form the words shown in FIG. 1G, then forms, according thereto, a binary signal approximately equal to that of FIG. 1B and forms, according to said signal, a reproduced image approximately equal to that shown in FIG. 1A. For the purpose of clarity the conversion of the words (image signal) of FIG. 1C into the words of FIG. 1E and further into the transmission codes of FIG. 1F will be referred to as a signal conversion B belonging to the present invention.

In the above-mentioned signal conversion B, wherein the black runs Aa are reproduced in a uniform length, the binary image signal reproduced at the receiver may be shortened or elongated in the direction of scanning depending upon the selection of run length for the black run Ab. It is thus to be noted that the codes of FIG. 1G contain 138 bits whereas those of FIG. 1C contain 140 bits.

In order to prevent such variation it is advisable, instead of simply eliminating the black runs Aa from the words in FIG. 1C to form the words in FIG. 1E, to previously compensate, in the white runs preceding or succeeding the black run Aa to be eliminated, the difference between said black run Aa and the black run Ab to be inserted as a substitute. More specifically, the black runs 63aa and 63e in FIG. 1C, which are both 4 bits, are subjected the subtraction of one extra black bit (thinning treatment) to reduce the length thereof to 3 bits (B3) thereby matching said length with that of black run Ab. Successively the thus subtracted one extra black bit is regarded as a white bit and added to the white runs 64-2, 64-7 preceding said black runs 63aa, 63e, or white runs succeeding said black runs if desirable, thereby obtaining the words shown in FIG. 1J. The successively elimination of the black runs A results in the words shown in FIG. 1H, and the transmission codes of FIG. 1I are obtained by the Wyle coding thereof with afore-mentioned identification code 0 or 1 at the beginning of each code.

Consequently the amount of information in this case is 74 bits. Upon electrical transmission of the transmission code of FIG. 1I, the receiver apparatus at first identifies if each code in FIG. 1I represents a white run or a black run Ba and the run length thereof to restore the words of FIG. 1H, then inserts the above-mentioned black runs Ab between the consecutive white runs thus identified to restores the words shown in FIG. 1I, then restores the binary image signal which is approximately equal to that shown in FIG. 1H and finally forms, according thereto, a reproduced image which is approximately equal to that shown in FIG. 1A.

Figure 1H:
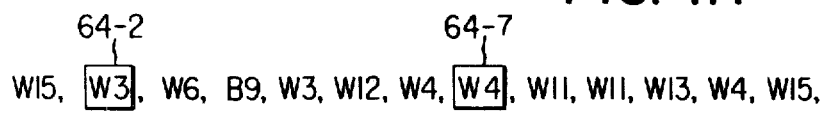
FIG. 1H shows the word representations obtained by a signal conversion C on the words shown in FIG. 1C.
Figure 1I:
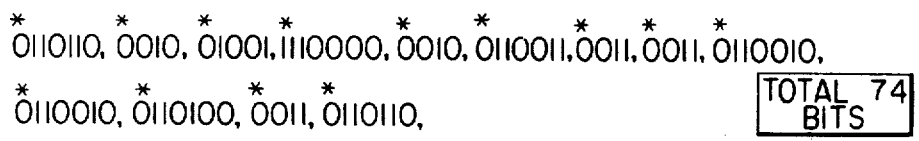
FIG. 1I shows the transmission codes obtained by compression treatment on the words shown in FIG. 1H and by adding identification codes on the code heads.
Figure 1J:
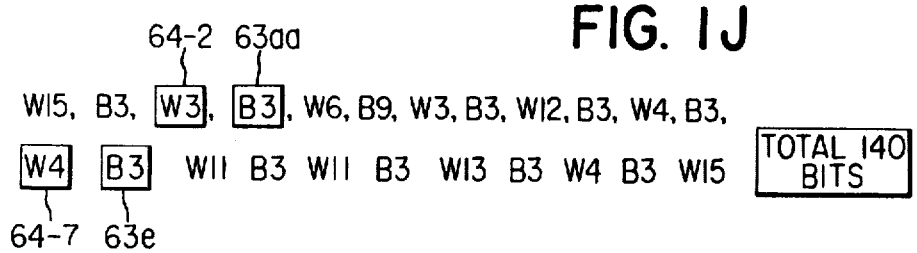
FIG. 1J shows the word representations obtained by reconverting the received transmission codes of FIG. 1I to the words of FIG. 1H and by adding black runs Ab between the successive white runs.

For the purpose of clarity the conversion from the words of FIG. 1C (binary image signal) into the words of FIG. 1H and further into the transmission codes of FIG. 1I will be referred to as a signal conversion C which also belong to the invention. Said signal conversion C restores a bit number of 140 for one scanning line as in the words of FIG. 1C and thus is capable of avoiding shortening or elongation is the direction of said scanning line if said black runs Ab are suitable selected. As the transmission codes of FIG. 1F and FIG.1I contains 74 bits while the words in FIG. 1C (binary image signal) contains 140 bits, the aforementioned compression ratio becomes 140/74=1.89 which is improved, in comparison with the compression ratio 1.54 obtained by aforementioned simple run length coding, by $(1.89/1.54-1) \times 100 = 22.7\%$. In this manner the transmission over a telephotone line of the transmission codes obtained by said signal conversion B or C allows a higher compression rate than in the conventional run length coding (signal conversion A), though it requires a facsimile apparatus wherein the receiver apparatus is structured to insert said black runs Ab in the above-mentioned manner. Now there will be given, in the following, a detailed explanation on the facsimile apparatus of the present invention.

Figure 3:
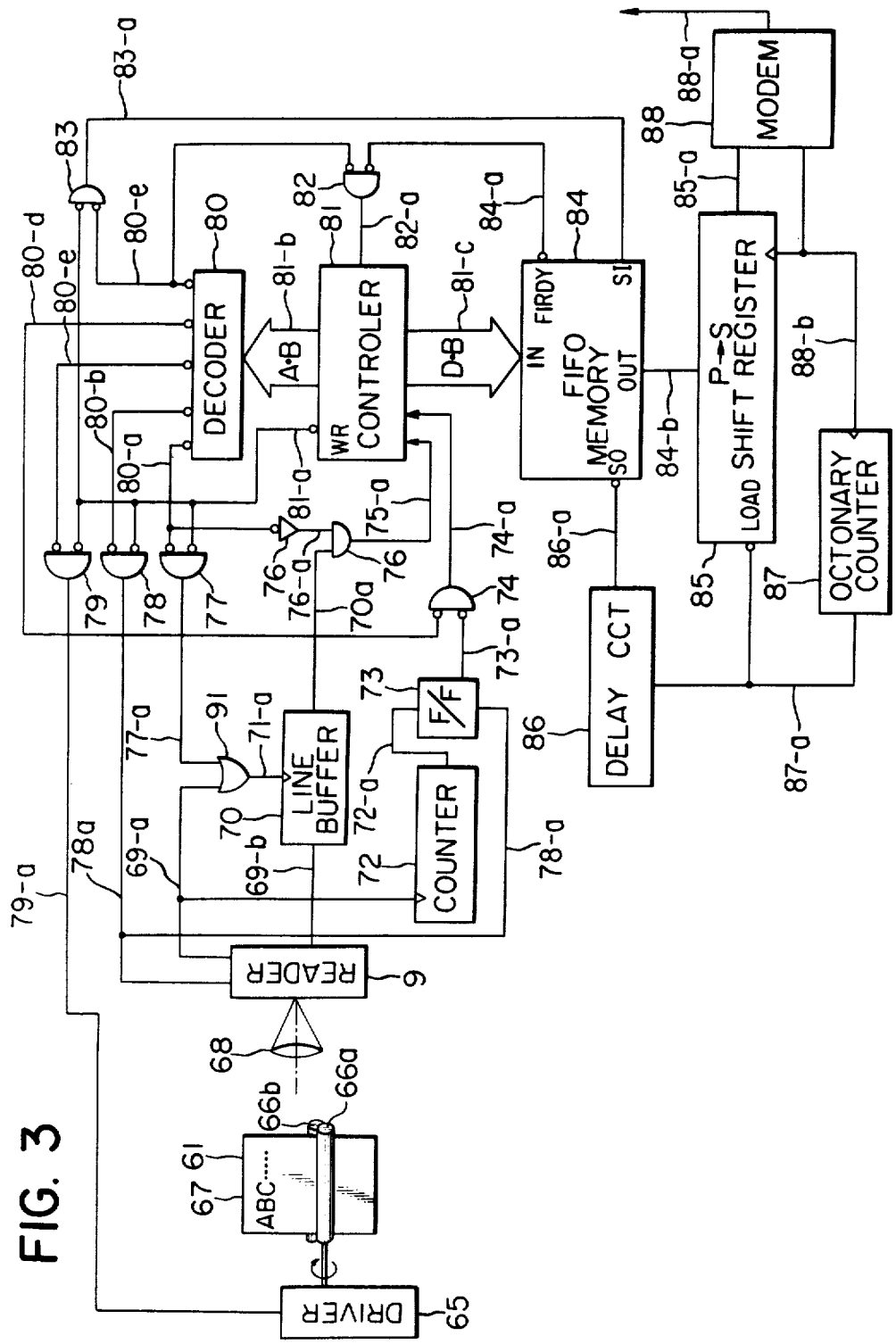
FIG. 3 is a circuit diagram of the facsimile apparatus of the present invention.

Referring to FIG. 3, a driver 65 is composed of a pulse motor and a driving circuit therefor adapted for advancing an original 61 by one run of said scanning line group 62 by an original drive signal 79-a which is to be explained later. Said original 61 is supported and advanced by a feed roller 66a driven by said driver 65 and a pressure roller 66b provided in facing relationship with said feed roller 66a.

The character 67 on said original 61 is focused through an optical system 68 onto a reader 69 composed for example of an image sensor such as a CCD or a photodiode array and a drive circuit therefor. The reader 69 initiates the scanning of one line upon receipt of a reading start signal 78-a to be explained later, and converts the image signal of one line into a binary image signal shown in FIG. 1B which, in response to gate signals composed of write-in clock signals supplied through a signal line 69-a, an OR gate 71 and an output line 71-a, is stored through a signal line 69-b into a line buffer 70. Simultaneously said write-in clock signals are counted by a counter 72 which is structured to release, upon counting 2048 which is equal to the number of bits in one line, a carry signal 72-a to the set terminal of a buffer-full flip-flop (hereinafter abbreviated as F/F) 73 of which reset terminal receives the above-mentioned reading start signal 78-a. In the above structure, upon release of the reading start signal 78-a from an AND gate 78, the reader starts the reading function of one line to supply the binary image signal 69-b in synchronization with the write-in clock signals from the reader 69. F/F 73 becomes OFF upon start of the reading function of one line and becomes ON upon completion of reading of one line, namely when the whole information of one line consisting of 2048 bits is stored in theline buffer 70. The line buffer 70 is provided in order to compensate the difference between the reading speed of said reader which is substantially constant regardless of the content of said binary image signal and the coding speed of a controller 81 which significantly varies according to the content of said binary image signal thereby realizing smooth transmission thereof. Though there is employed one buffer in the present embodiment, it is already known that a further higher efficiency can be achieved if two buffers are alternately used.

The controller or compression processing means 81 performs a sequence control over the entire facsimile apparatus and also performs the aforementioned signal conversion B or C on the binary image signal stored in said line buffer 70. Said controller can be composed of a microcomputer or a hard-wired control logic circuit.

Said controller 81, being the most important portion in the facsimile apparatus of the present invention, will be detailedly explained later in combination with a decoder 80.

The transmission codes produced in said controller 81 is stored, through a data bus 81-c, in a First In First Out memory 84 (hereinafter referred to as FIFO memory), which is provided in order to compensate the difference between the output speed of transmission codes from said controller 81 and that from a modulation-demodulation apparatus 88 (hereinafter) referred to as MODEM). The characteristics of such FIFO memory are already known for example from the catalogue of Fairchild Inc., U.S.A., for MOS LSI3351 and will not be explained, therefore, in detail. The controller 81 investigates a sense signal 84-a from FIFO INPUT READY terminal (hereinafter referred to as FIRDY) of said FIFO memory 84 and a signal 82-a from the AND gate 82. The FIRDY becomes OFF or ON respectively when the FIFO memory is full or when it has a space for data memory. Thus the controller 81 writes in the transmission codes through the data bus 21-c into the FIFO memory 84 in case the FIRDY is in ON state. In this case the write-in clock signals are supplied, by a shift-in signal 23-a, to the SHIFT IN terminal (hereinafter referred to as SI) of the FIFO memory. The transmission codes memorized in the FIFO memory are supplied, from the output terminal thereof and through a signal line 24-b, to a parallel-in-serial-out register 85 which thus receives parallel 8-bit transmission codes and serially supplies the same, through an output line 85-a, to the MODEM 88. The MODEM 88 serially receives said transmission codes from said shift register 85 in synchronization with transmission clock signals 28-b which are simultaneously supplied to and counted by an octonary counter 87. Upon every counting of 8 pulses said octonary counter 87 releases a carry signal 87-a which is supplied to the LOAD terminal of the above-mentioned shift register 85, whereby upon completion of transmission of every 8-bit transmission code from the MODEM 88 a new transmission code of 8 bits is supplied to the shift register 85 from the FIFO memory 84. Said carry signal 87-a is also supplied to a delay circuit 86 of which output is supplied to a SHIFT OUT terminal (hereinafter abbreviated as SO) of the FIFO memory 84, whereby a shift out signal 86-a is supplied to the FIFO memory after a new 8-bit transmission code is latched in the shift register 85.

The MODEM or transmission means 88 is composed of an unrepresented modulation-demodulation circuit and an unrepresented level control circuit. The transmission codes supplied from said shift register 85 and through the output line 85-a are supplied to said modulation-demodulation circuit and subjected to a modulation therein. In general the facsimile apparatus are intended to transmit the image signals through a telephone line generally capable of transmitting a frequency band from 300 Hz to 3.4 kHz. The transmission codes from the shift register 85 contains, however, a DC or OHz component and cannot be transmitted, therefore, through a telephone line. The transmission of said transmission codes through telephone line is rendered possible by selecting a carrier frequency transmittable through said telephone line and by modulating said carrier frequency by said transmission codes. Said modulation can be achieved in a substantially same principle as in the AM or FM modulation employed in the radio broadcasting. Also it is possible to employ the PM or other modulating methods. Also, in certain cases it becomes necessary to demodulate, at the transmitter, the modulated signal transmitted from the receiver in order to achieve bidirectional signal transmission, for example for the transmitter receiving a confirmation signal for the proper receipt of the above-mentioned transmission codes by the receiver. Said modulation-demodulation circuit performs said modulation and demodulation, thus modulating the codes from the shift register 85 into a transmittable signal and demodulating the signal received from the receiver. The output of said modulation-demodulation circuit is supplied to said level control circuit which is provided to prevent the undesirable effect on the telephone channel resulting from an excessively high output of the modulated transmission codes, the undesirable effect on the transmitter apparatus resulting from an excessively high input of the received signal, and the troubles resulting from an excessively small input or output. Thus the MODEM 88 performs the modulation of the transmission codes supplied from the shift register 85, the demodulation of the received signal and the level control of said codes thereby achieving a smooth transmission and reception of signals through the telephone line.

Figure 4:
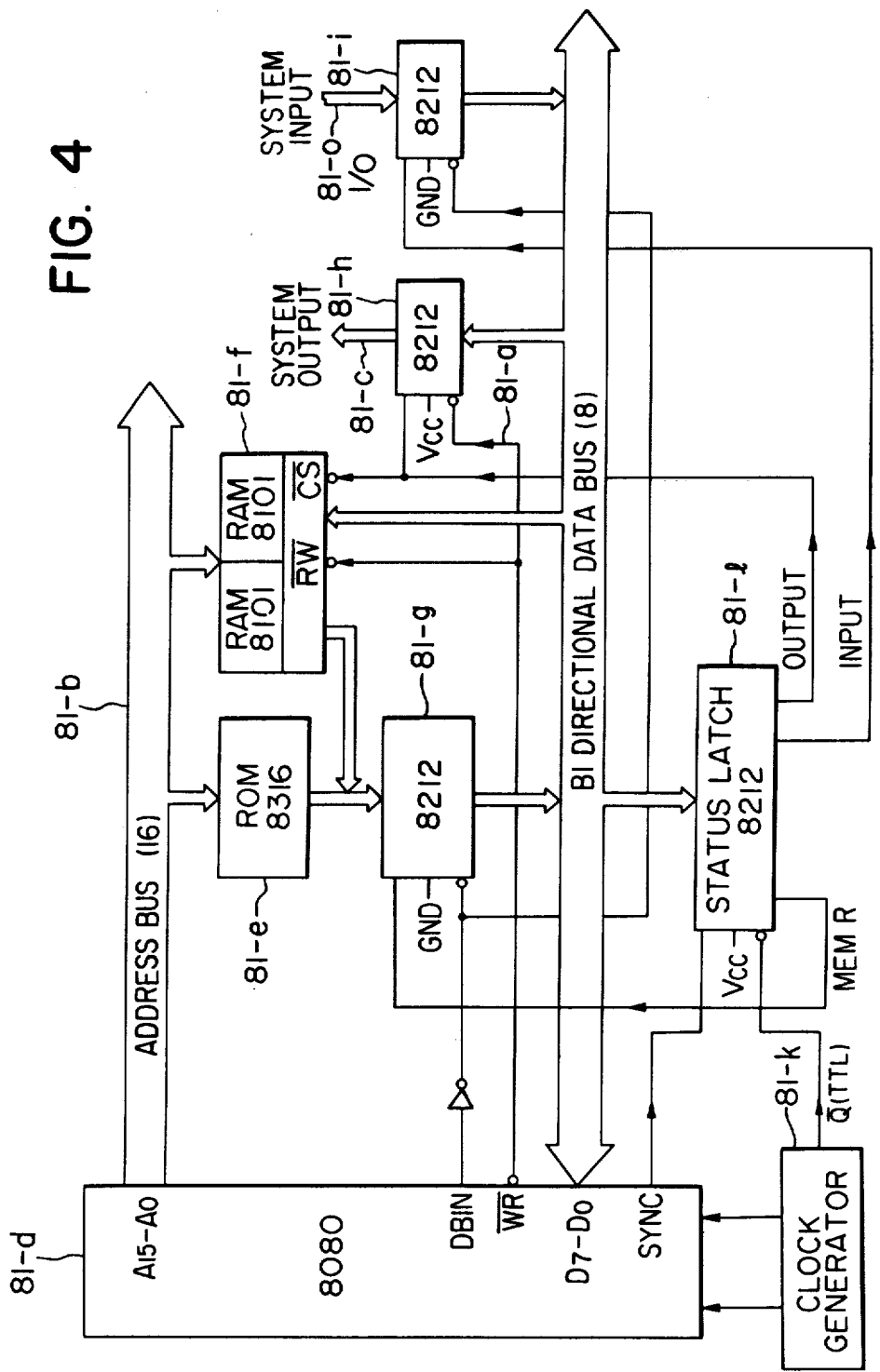
FIG. 4 is a block diagram of the controller.
Figure 5:
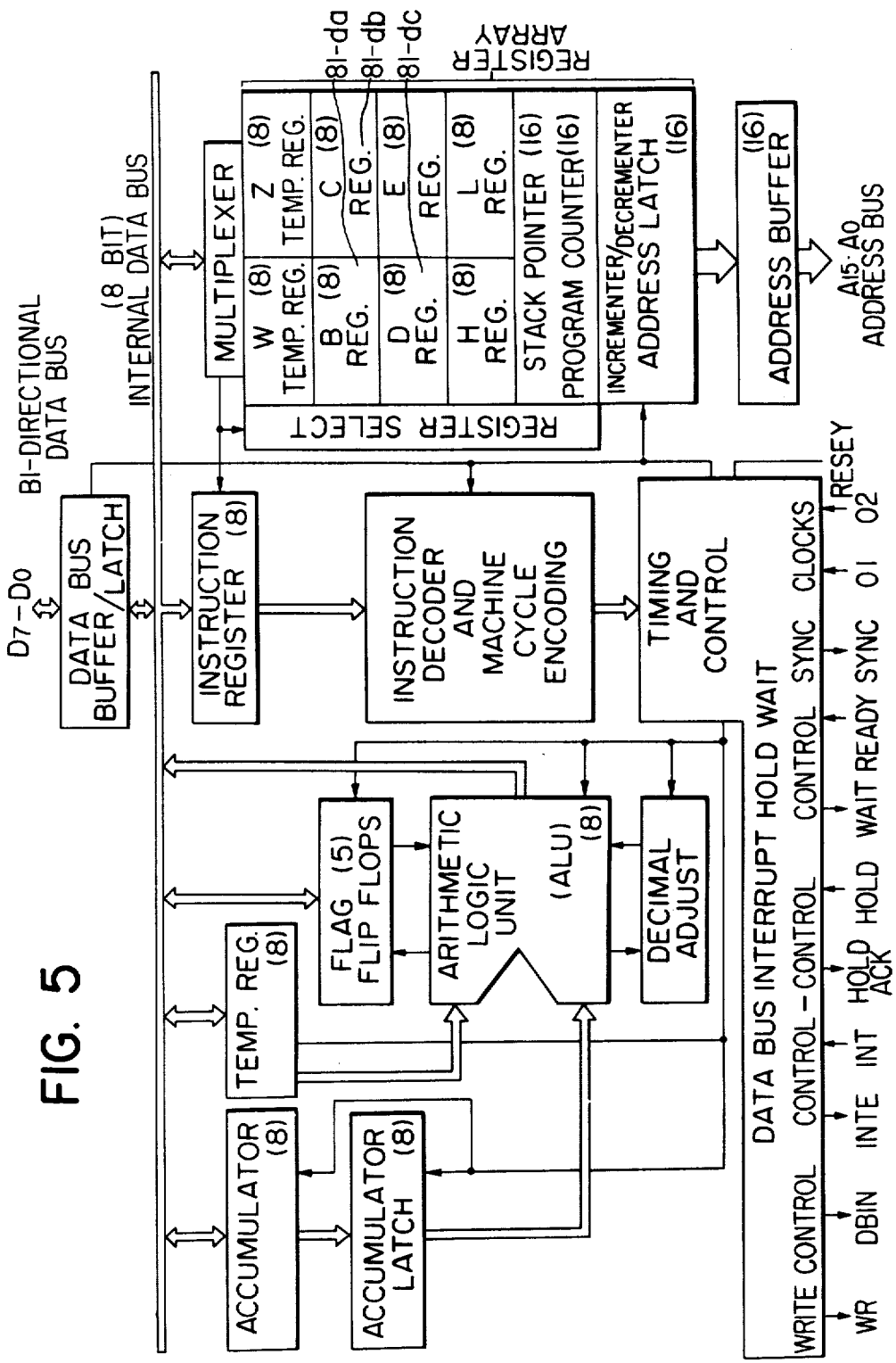
FIG. 5 is a block diagram of the CPU.

FIG. 4 shows the internal structure of the controller 81, and FIG. 5 shows the internal structure of the Intel 8080 which is employed as the CPU in said controller. The controller is composed of a microcomputer 81-*d* (Intel 8080), a ROW 81-*e* (Intel 8316), a RAM 81-*f* (Intel 8101), a status latch 81-*l* (Intel 8212), bus drivers 81-*g*, 81-*h* and 81-*i* (Intel 8212), and a clock pulse generator 81-*k*. It is to be noted that the 74-*a*, 75-*a* and 82-*a* in FIG. 3 are represented by 81-*o* in FIG. 4. The basic functions of said controller and the functions of the CPU are already explained in detail in prior references such as 8080 Microcomputer Systems User's Manual published by Intel Corp, while the softwares for microcomputer 8080 are explained detailedly in prior references such as 8080 Assembly Language Programming Manual published by Intel Corp., so that no detailed explanation will be given herein.

Now there will be given an explanation on the interface between the controller 81 and the external input/output (hereinafter abbreviated as I/O). As address bus 81-*b* is connected to a decoder 80 to produce various I/O selection signals. The relationship between the various I/O and the decoder output is summarized in the following Tab. 2;

Table 2

| I/O | Decoder output signal | Decoder output |
|---|---|---|
| Driver 65 | Driver selection signal | 80-c |
| Reader 69/FIF 73 (reset) | Reader selection signal | 80-b |
| FIFO memory 84(SI) | FIFO memory selection signal | 80-e |
| FIFO memory 84 (FIRDY) | FIRDY sense selection signal | 80-e |
| Line buffer 70 | Line buffer selection signal | 80-a |
| F/F 73 (output) | F/F output sense selection signal | 80-d |

As shown in Tab. 2, each output from the decoder is supplied through a respective gate to function as a control signal for respective I/O. For example the original drive signal 79-*a* supplied to the driver 65 in FIG. 3 is obtained as a logic AND of said driver selection signal 80-*c* and a WR signal 81-*a* from the controller 81. The following Tab. 3 summarizes the I/O control signals produced in various gates.

Table 3

| I/O | Gate No. Logic | Gate Input Gate Output | In/Out seen from controller | Remarks |
|---|---|---|---|---|
| Driver 65 | 79 (AND) | AND of 80-c and WR (81-a) Original drive signal (79-a) | OUT | |
| Reader 69/FIF 73 (reset) | 78 (AND) | AND of 80-b and WR Reading start signal (78-a) | OUT | |
| Line buffer 70 | 77 (AND) | AND of 80-a and 81-a Output (71-a) | OUT | |
| FIFO memory 84 (SI) | 83 (AND) | AND of 80-e and WR Reading start signal (83-a) | OUT | |
| FIFO memory 84 (FIRDY) | 82 (AND) | AND of 80-e and 84-a FIRDY sense signal (82-a) | IN | Connected to SYSTEM INPUT 81-o of controller 81 |
| Line buffer 70 | 75 (AND) | AND of 70-a and 76-a (80-a) Binary Image signal (75-a) | IN | |
| F/F 73 (output) | 74 (AND) | AND of 80-d and 73-a F/F 73 output sense signal (74-a) | IN | Connected to SYSTEM INPUT 81-o of controller 81 |
| Line buffer 70 | 71 (OR) | OR of 69-a and 77-a Output (71-a) | | |
| FIFO memory 84 (IN) | | Transmission codes 81-c (8 bits) | OUT | Connected to SYSTEM INPUT 81 o of control- |

Table 3-continued

| I/O | Gate No. Logic | Gate Input Gate Output | In/Out seen from controller | Remarks |
|---|---|---|---|---|
| | | | | ler 81 |

The information processing for said one scanning line proceeds in the above-mentioned manner, and upon entry of an original drive signal 79-a from the controller 81 to the driver 65 there are actuated the above-mentioned feed roller 66a and the pressure roller 66b to advance the original 61 in an auxiliary scanning direction, i.e. upward or downward in FIG. 3 by one line spacing between the scanning lines 62-1 and 62-2 in FIG. 1(A) whereupon the succeeding scanning line 62-2 is read by the reader 69. The scanning is thereafter continued in a similar manner to achieve the scanning on the entire surface of the original 61.

Figure 6B:
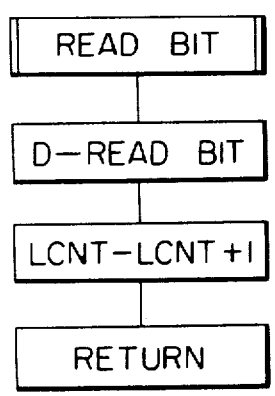
FIG. 6B is a flow chart of Read Bit in FIG. 6A.
Figure 6C:
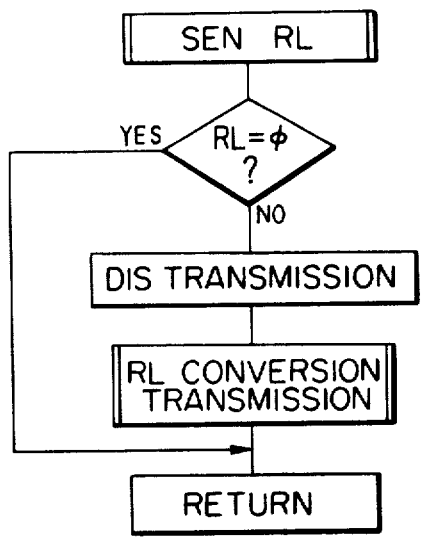
FIG. 6C is a flow chart of Sen RL in FIG. 6A.
Figure 6D:
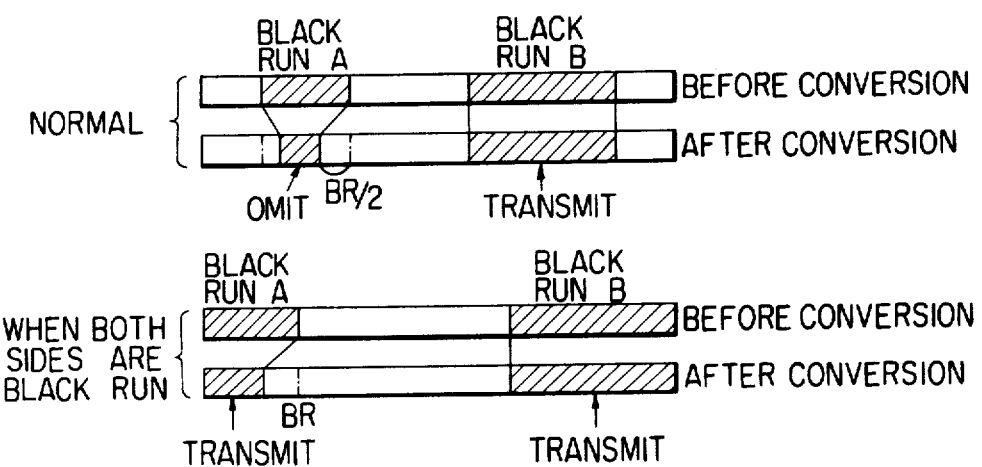
FIG. 6D is a drawing explaining the processing when the both ends of a scanning line consist of black runs.
Figures 7, 7B:
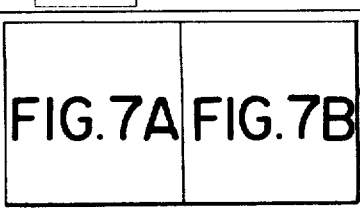
FIG. 7 is a table representing information processing routines according to the flow charts shown in FIGS. 6A-6C.
Figure 8A:
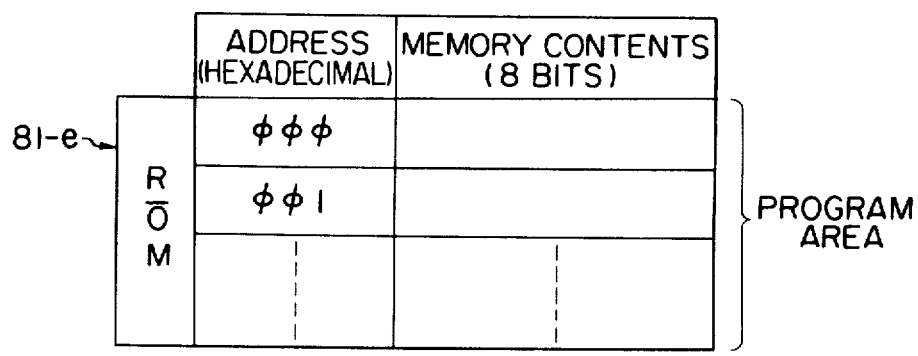
FIG. 8A is a memory map in the ROM.
Figure 8B:
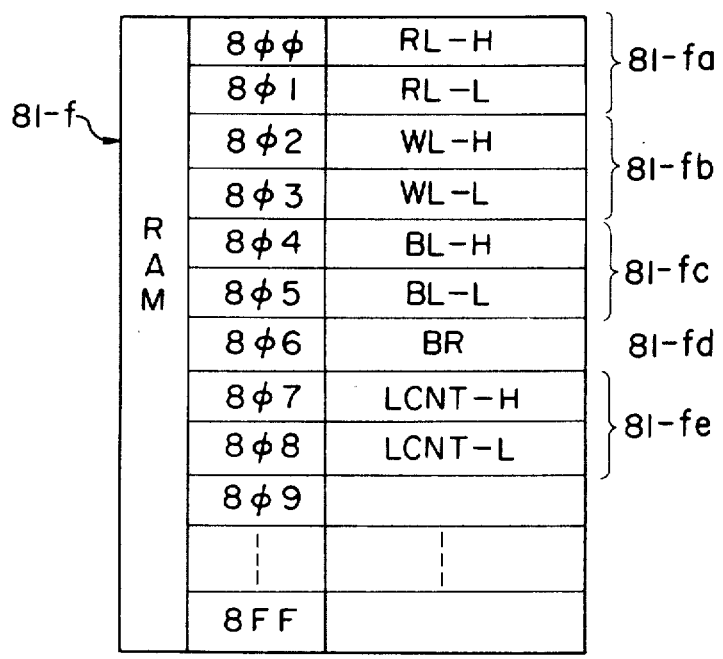
FIG. 8B is a memory map in the RAM.

FIGS. 6(A), (B) and (C) show the flow charts of the aforementioned signal conversion procedures B and C to be performed in said controller 81, while FIG. 6(D) show the process in case both ends of a scanning line are composed of black runs. Also FIG. 7 shows the path of processing according to the flow chart shown in FIG. 6(A), wherein the asterisk * indicates a process through a right-hand path. Further FIG. 8(A) and FIG. 8(B) are memory maps respectively of the ROM 81-e and of RAM 81-f used in said controller.

Symbols used in FIG. 6(A) have the following meanings:

RL: a 16-bit run length counter 81-fa (FIG. 8);
WL: a 16-bit white run length counter 81-fb (FIG. 8);
BL: a 16-bit run black run length counter 81-fc (FIG. 8);
LCNT: a 16-bit line counter 81-fe (FIG. 8);
D: a new data memory 81-da (FIG. 5);
MOD: an old data memory 81-db (FIG. 5);
B: a black bit (=1) memorized in the program in the ROM;
W: a white bit (=$\phi$);
MIN: a constant (=3) memorized in the program of the ROM;
MAX: a constant (=9);
BR: an 8-bit calculation result memory 81-fd (FIG. 8);
DIS: a discrimination (identification) bit memory 81-dc (FIG. 5);

Also the symbol //____// indicates a sub-routine. The sub-routines //Read bit// and //Sen RL// are explained respectively FIGS. 6(B) and (C). The sub-routine //RL Conversion transmission// which does not appear in FIG. 6(A) will be briefly explained in the following. Said sub-routine performs the functions of converting the data memorized in RL into the Wyle codes according the Wyle coding method explained in connection with FIG. 2, and of supplying said codes to said FIFO memory 84 by 8 bits each time. Thus the FIFO memory 84 stores the transmission codes of a form shown in FIG. 1 (I). The aforementioned Wyle coding method is detailedly explained in a report entitled "Reduced-time facsimile transmission by digital coding" (H. Wyle et al.; IRE Trans. Com-9, p. 215 (1961-09) and is obviously realizable with the above-mentioned controller 81 or a device of an equivalent function. Further it is to be noted that the black runs to be eliminated at the Note 1 in FIG. 6(A) are those of which run length satisfy a condition MIN ≦ RL < MAX, that the calculation to be conducted at the Note 2 is an integer calculation, and that, in the Note 3, the black runs at both ends of each scanning line are always transmitted as in the example shown in the lower part of FIG. 6(D).

Now FIG. 7 and the flow chart shown in FIG. 6A will be explained in connection with the processing of binary image signal of a scanning line asterisked (*) in FIG. 7. The process of FIG. 6A and in FIG. 7 starts from a path 29. Before starting the processing of one line, an initial setting $\phi$ is written into WL, BL and BR. Also a negative bit number of one line, namely −16 in this case, is written into the LCNT. Then there is executed the Read Bit sub-routine (See FIG. 6B). In this sub-routine the controller 81 releases a line buffer selection signal 80-a to take in one bit of the line buffer 70 through the AND gate 75 as a binary image signal 75-a and writes said bit as a new data into the new data memory D (81-da). Successively "1" is added to the content of LCNT to complete the Read Bit sub-routine. Successively "1" is written into the RL. The programs proceeds to the path 30 to write the content of D into the MOD 81-db and then to the path to execute the Read Bit sub-routine. Then the program identifies if the content of MOD (81-db) is equal to that of D (81-da). The result being MOD≠D in this case, the program proceeds through the path 35 to identify if MOD=W. The result being YES in this case, the program proceeds through the path 37 to write the content of RL (1 in this case) into WL, then write "1" into RL and identify if LCNT=$\phi$. The result being NO as LCNT=−14, the program proceeds through the path 50 to the path 30, thereupon writing the content of D (81-da) into the MOD (81-db) and executing the Read Bit sub-routine, followed by the identification if MOD=D. The result being YES in this case, the program proceeds through the path 32 to write "2" into RL and identify if LCNT=$\phi$. The result being NO as LCNT=−13, the program proceeds through the path 35 to the path 31 whereupon the foregoing steps are repeated. When the 6th and 5th data counted from the left-hand end of the binary image signal of one line consisting of 16 bits are written respectively into D (81-da) and MOD (81-db) to reach the values RL=4 and LCNT=−10, the result of identification if MOD=D becomes NO whereby the program proceeds through the path 33 to the path 34. As result of identification if MOD=W being NO, it further proceeds to the path 36. The result of identification being YES as RL satisfies the condition 3 (MIN)≦RL(=4)<9 (MAX), the program proceeds to the path 38, wherein there is executed an integer calculation (RL−MIN) of which result is stored in BR (81-fd). Successively there is conducted an identification if WL=$\phi$ in order to identify if the black run of which run length is memorized presently in RL (81-fa) is a black run located at the left-hand end of one line. WL being 1 in this case, the program proceeds to the path 40 wherein there is conducted an identification if LCNT=$\phi$ in order to identify if the black run of which run length is memorized in RL (81-fb) is a black run located at the right-hand end of one line. LCNT being −10 in this case, the program proceeds through the path 42 to write $\phi$ into BL (81-fc) and also write the sum of the content of WL and a half of content of BR into the WL. The content of BR being 1 in this case, a fraction of an integer is disregarded in the calculation to result $WL=1+\frac{1}{2}=1$. Upon successive identification if BR is odd, the result being YES as BR=1, the program proceeds through the path 45 to write $1+1=2$ into WL (81-*fb*) and write $\phi$ into BR, then proceeds through the path 48 to write the content of W ($=\phi$) into DIS (81-*dc*) and to write the content of WL (81-*fb*) into RL (81-*fa*), and proceeds further to the Sen RL sub-routine (see FIG. 6C).

In said Sen RL sub-routine there is at first conducted an identification if $RL=\phi$. The content of RL being 2 in this case, the content of DIS (81-*dc*) (memorizing information $\phi$ indicating a white run) is supplied to the FIFO memory 84 and then executed is the above-mentioned RL Conversion Transmission sub-routine, whereupon the program completes the Sen RL sub-routine and returns to the main flow.

Successively the program writes the content of B ($=1$) into DIS (81-*dc*), then supplies the content thereof to the FIFO memory 84 and execute the aforementioned RL Conversion Transmission sub-routine. Further the program writes "BR+1" into RL (81-*fa*), then writes $\phi$ into BR (81-*fd*) and BL (81-*fc*) and identifies if $LCNT=\phi$. The result being NO as $LCNT=-10$, the program returns through the path 51 to the path 30. Upon reaching values $RL=11$, $LCNT=\phi$ and $MOD=D=\phi$ after repeating the paths 31–32–35 ten times, the program proceeds to the path 34 to identify if $MOD=W$. The result being YES, the program proceeds through the path 37 to write the content of RL (81-fa) into WL (81-*fb*), to write "1" into RL (81-*fa*) and to identify if $LCNT=\phi$. The result being YES, the program proceeds through the path 49 to the path 48.

Successively there are repeated the foregoing steps wherein white runs alone are subjected to the RL Conversion Transmission by the Sen RL sub-routine because of the values $WL=11$ and $BL=\phi$. The program proceeds through the path 52, and, the result of identification if $MOD=D$ being YES, through the path 54 to complete the processing of one line.

In addition to the foregoing example FIG. 7 shows the processing path for other 23 binary image signals. As explained in the foregoing, the actual processing functions performed in the controller 81 such as write-in or read-out of the memory, calculation, identification etc. are detailedly explained in aforementioned two User's Manuals publised by Intel, so that explanation thereof will be omitted in the present specification.

Also the use of a CPU in the controller 81 superior in processing speed and processing ability to the above-explained CPU, Intel 8080, allows to perform a thinning treatment which is already known in OCR technology thereby rendering constant the line width of image information prior to said signal convertion C and thus widening the applicable range of said signal convertion C.

As explained in the foregoing, the facsimile apparatus of the prevent invention enables a significant reduction in the information transmission time by applying a suitable processing to said black runs Aa. However, in case the original consists of pictorial information, such signal conversion B or C, or said thinning treatment will significantly deteriorate the quality of image reproduced at the receiver. For this reason, the original containing pictorial information, it is necessary to suitably select whether or not to apply said signal conversion B or C in order to prevent the deterioration of image quality. In case the original contains pictorial information for which the use of said signal conversion B or C is inadequate, it is possible to select said threshold values as 0 ($MAX=MIN=0$), wherein no black runs Aa are selected and all the black and white runs are transmitted, namely, according to the aforementioned signal conversion A. In this manner it is possible to improve the image quality though the transmission line is inevitably rendered longer.

Now there will be given, in the following, an explanation on the receiver apparatus of the facsimile apparatus according to the present invention.

Referring to the block diagram shown in FIG. 9, said receiver apparatus of the present invention is composed of a network control device (hereinafter referred to as NCU) 105, a modulation-demodulation device 106 (hereinafter referred to as MODEM), an octonary counter 107 for 8-bit input/output into or from a controller 111 of the band-compressed code bit train (hereinafter referred to as binary facsimile signal) serially supplied from said MODEM 106, a delay circuit 108, a serial-in parallel-out 8-bit shift register 109, a first-in-first-out memory 10 (hereinafter referred to as FIFO memory 110) functioning as a buffer for the difference of transmission speed of said binary facsimile signal from the transmitter apparatus and the processing speed for said binary facsimile signal by said controller 111, a controller 111 for performing sequence control over the entire receiver apparatus and also performing conversion of said binary facsimile signal into a binary image signal, a line buffer 134 for memorizing said binary image signal of one line and thus compensating the difference between the signal conversion speed of said controller 111 and the recording speed of a printer unit 133 to be explained later, a printer unit 133 for receiving said binary image signal and thus recording the received image, an 8-bit binary counter L122, a 4-bit binary counter H123, and various gates 112–120, 124, 127, 128 and 130.

The function of the receiver apparatus will be briefly explained in the following. The signals transmitted through a telephone line are supplied through NCU 105 to the MODEM or receiving means 106 and converted therein from AC signals into binary facsimile signals 106-*a*, which are in succession supplied to the shift register 109 in synchronization with the modem clock signals 106-*b*. Said modem clock signals 106-*b* are simultaneously supplied to the octonary counter 107 which, upon counting of every 8 clocks, releases a carry signal 107-*a* to the delay circuit 108, of which output functions as the FIFO shift-in pulse signal 108-*a*. By means of said pulse signal, the binary facsimile signal of each 8 bits is memorized, through the parallel output 107-*a* of the shift register 109, into the FIFO memory 110.

The delay circuit 108 is provided in order to release the FIFO shift-in pulse 108-*a* after the parallel 108-*a* of the shift register 109 becomes sufficiently stabilized. The FIFO memory 110 is composed of a MOS LSI memory of which function is detailedly explained for example in a catalogue for Fairchild MOS LSI 3351.

The controller or image forming means 111 takes in said binary facsimile signal from the FIFO memory 110 in a form of bit (8 bits) through the gate 112 and the SYSTEM INPUT terminal 140-*a* and converts into a binary image signal. Said conversion is an important feature of the present invention and will therefore be detailedly explained later.

The binary image signals of one line are temporarily stored in the line buffer 134. The printer unit 133 takes in said signals from the line buffer 134 in synchronization with a print start signal 135-a supplied from the controller 111 through a decoder 121 and an AND gate 135 thereby initiating the recording of one line of received image. The foregoing steps are repeated for each line to obtain a received image.

Figure 10A:
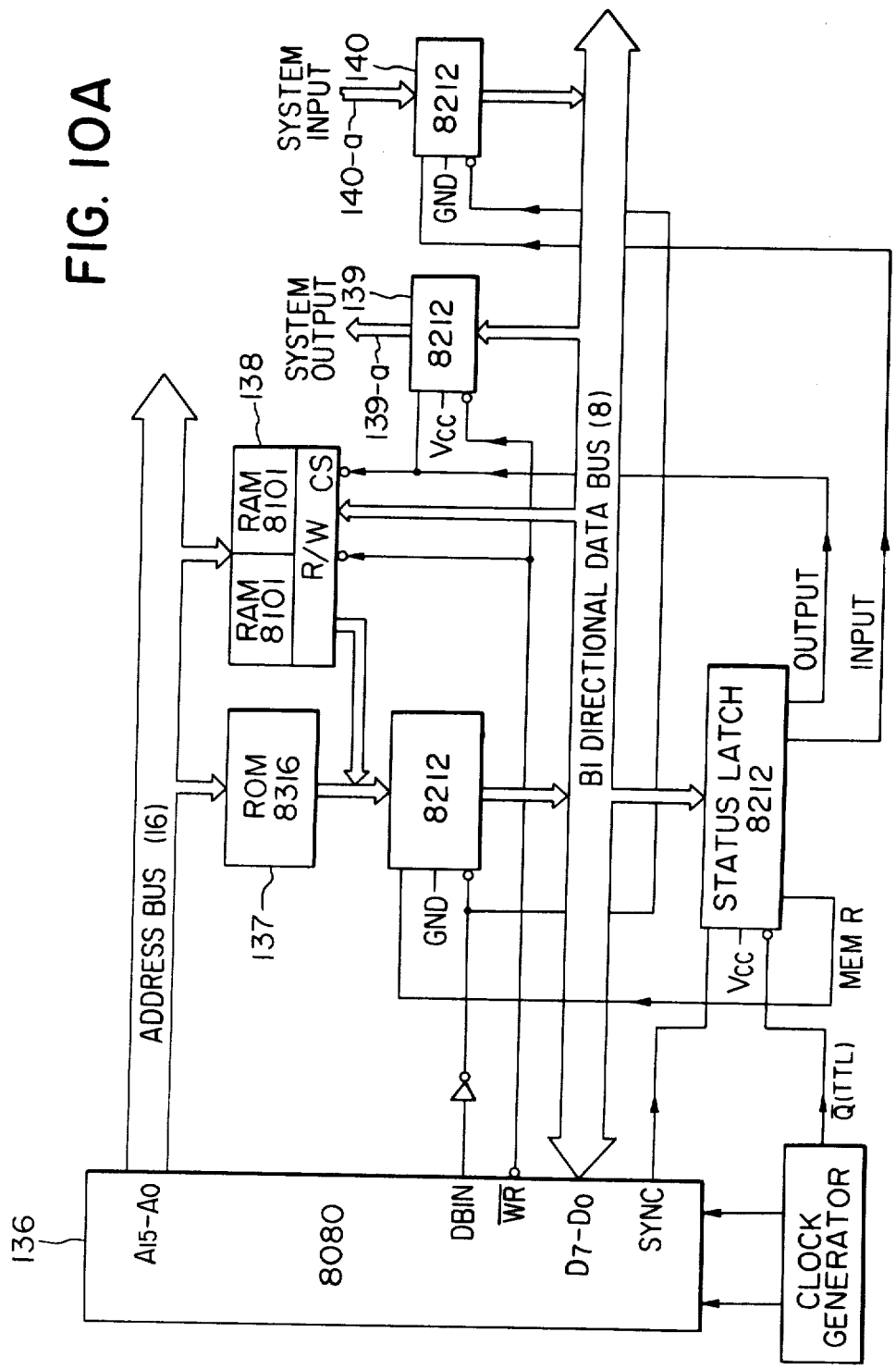
FIG. 10A is a block diagram of the controller.
Figure 10B:
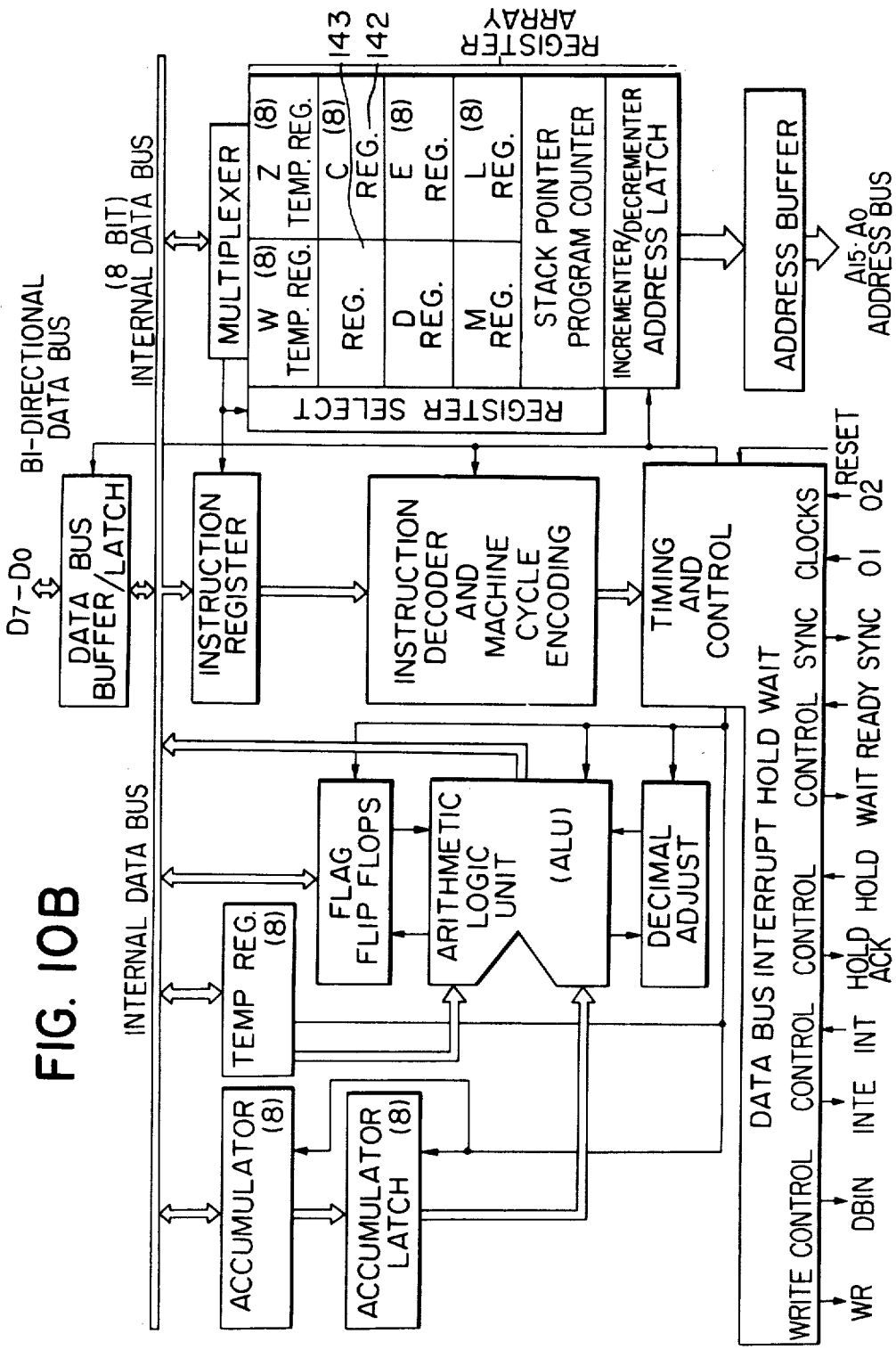
FIG. 10B is a block diagram of the CPU.

FIG. 10(A) shows the internal structure of the controller 111 while FIG. 10(B) shows the internal structure of CPU (Intel 8080) used therein. The functions and abilities of such controller are detailedly explained in the Hardware Manual and Software Manual for Intel 8080 and will not be given, therefore, detailed explanations.

The ROM 137 in said controller 111 stores the programs for sequence control over the entier receiver apparatus and for aforementioned conversion from said binary facsimile signals into binary image signals. The RAM 138 is utilized as a memory required in execution of the abovementioned programs. FIGS. 11(A), (B), (C) and (D) respectively show the memory map of ROM 137, RAM 138, B-register 143 and register 147. Also FIG. 11 (E) shows the state of said register 147 with stored data.

Figure 12A:
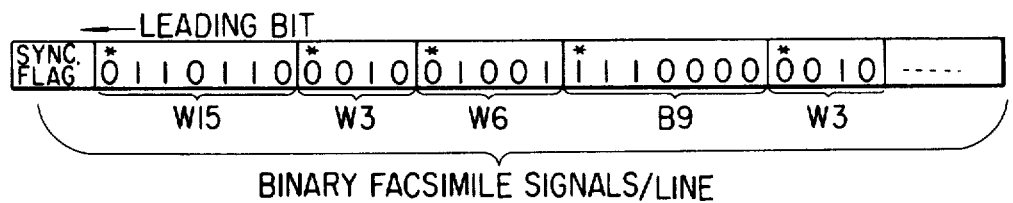
FIG. 12A shows the composition of received binary facsimile signals.

Now there will given a detailed explanation on the conversion of binary facsimile signals into binary image signals, while making reference to FIGS. 12(A), (B) and (C).

Figure 12B:
FIG. 12B shows the composition of synchronizing flags.
Figure 12C:
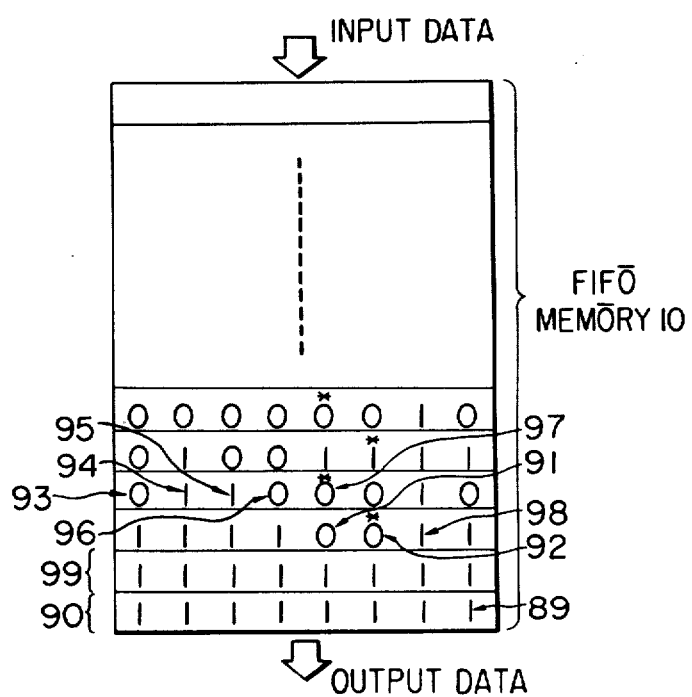
FIG. 12C is a memory map of the memory FIFO.

FIG. 12(A) shows the structure of binary facsimile signal for one line received at the receiver. The synchronizing flag is a signal for synchronizing each line, and is composed, as shown in FIG. 12(B), of twenty consecutive "1" and one "φ". The signals following the synchronizing flag are those for image information, and, as an example, there are shown initial five blocks of image signals in FIG. 12(A), wherein W15 stands for a block of 15 consecutive white bits while W3 stands for a block of 3 consecutive white bits. FIG. 12(C) shows how said binary facsimile signals are stored, through said shift register 109, in said FIFO memory 110. In this case the data output 110-c of said FIFO memory 110 has a bit arrangement shown by 90 in FIG. 12(C).

The flow charts of signal conversion routines are shown in FIGS. 13(A)-(D), according to which the conversion of binary facsimile signals shown in FIG. 12(A) wll be explained.

Figure 13B:
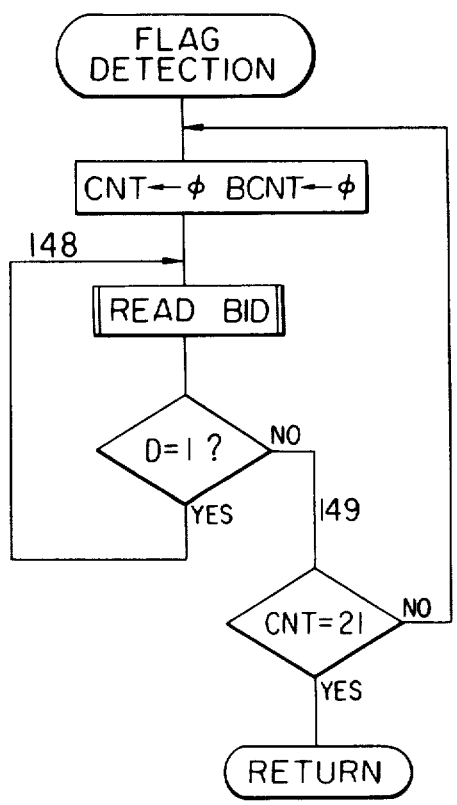
FIG. 13B is a flow chart of the sub-routine for synchronization flag detection.

Referring to FIG. 13(A), the controller 111 performs at first the detection of synchronizing flag, according to a sub-routine shown in FIG. 13(B).

Figure 13D:
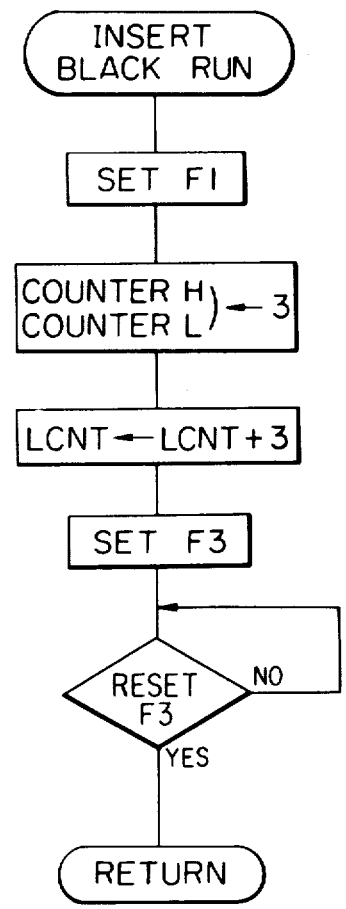
FIG. 13D is a flow chart of the black run insertion.
Figure 13C:
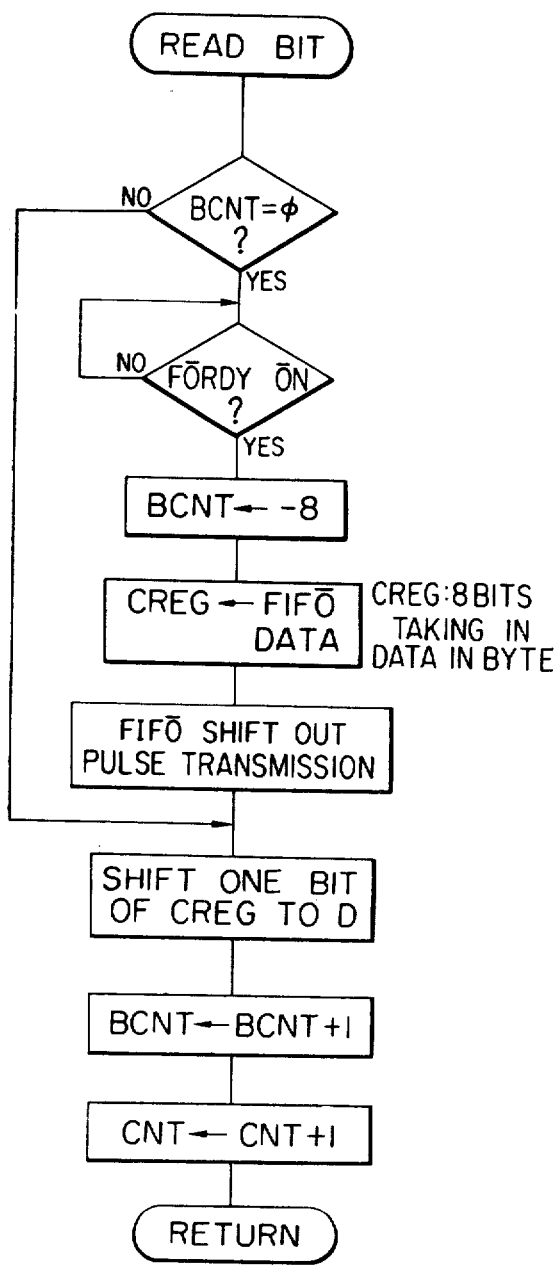
FIG. 13C is a flow chart of the Read Bit sub-routine.

The controller 111 writes φ into an 8-bit counter 144 (hereinafter referred to as CNT) at the address 8φφ in the memory map of FIG. 11(B) and also φ into a bite counter 145 (hereinafter referred to as BCNT) at the address 8φ1 thereof and executes the succeeding Read Bit sub-routine shown in FIG. 13(C), in which there is performed an identification if BCNT 145 is φ, and the result being YES since BCNT=φ in the beginning as mentioned above, there is checked the state of FIFO memory 110.

The controller 111 takes in the signal of the OR (OUTPUT READY) terminal 110-b of FIFO memory 110, said signal being hereinafter referred to as FORDY, through an AND gate 113 shown in FIG. 9 and the SYSTEM INPUT terminal 140-a and identifies if the FORDY is ON or OFF. The FORDY is 1 (ON) or φ (OFF) respectively if the binary facsimile signals are memorized or not in the FIFO memory 100. In case of FORDY OFF, the controller 111 waits until the FORDY becomes ON. In case of FORDY ON, the controller 111 writes "−8" into BCNT 145 and takes in one bite of the data output 110-c of the FIFO memory.

This function is achieved by opening a tri-state gate 112 by means of a data input signal 121-a (FIG. 9) and supplying the data output 110-c through the SYSTEM INPUT terminal 140-a into the controller 111. The controller 111, after memorizing said one bite of input data in the CREG 142 in the CPU (FIG. 10(B)), releases a FIFO shift-out pulse 114-a through the decoder 121 and AND gate 114 to the SO terminal 110-a of the FIFO memory 110, thereby step shifting the content of the FIFO memory 110. As the result the data output 110-a of said FIFO memory 110 becomes that shown by 99 in FIG. 12(C). Then the lowermost bit of the content of CREG 142 is written into a flag 141 (hereinafter referred as D) on the controller. In the present example the bit 89 in FIG. 12(C) is written into D. Successively the content of CREG 142 is step shifted to the right, and the contents of BCNT 145 and CNT 144 are respectively step increased to complete the Read Bit sub-routine, thereupon the program returns to the flag detecting routine shown in FIG. 13(B).

Successively the controller 111 identifies if D is 1 or φ. The result being YES in this case, the program proceeds through the path 148 to execute again the Read Bit sub-routine. The foregoing steps are repeated for 21 times, and, upon memory of 21st bit φ (corresponding to 91 in FIG. 12(C), in D, the program proceeds through the path 149 to identify the content of 144.

Said content becomes equal to 21 when twenty consecutive "1" are followed by one "φ". In this manner the synchronizing flag can be detected, and the controller 111 thereafter returns to the one line converting routine shown in FIG. 13(A).

Successively the controller 111 performs the following initial resettings of:

setting CNT to φ;

writing −2048 into a 16-bit line counter 146 (hereinafter referred to as LCNT 146) at the addresses 8φ2 and 8φ3;

writing φ into a 16-bit register 147 (hereinafter referred to as REG 147) at the addresses 8φ4 and 8φ5; and writing φ and 1 respectively in the memories MOD and BRMOD for both of which utilized is BREG 143 in the CPU.

Successively the controller executes the above-mentioned Read Bit sub-routine, whereby an identification bit shown by 92 in FIG. 12C is set in D. Then the controller copies the content of D into MOD and again executes the Read Bit sub-routine. Upon successive identification of the content of D, the result thereof being NO as D memorizes the bit 98 in FIG. 12C in this state, the program returns to the path 150. Upon repetition of two times of the foregoing steps, the D memorizes the bit 93 shown in FIG. 12C whereby the program proceeds to the path 151, with a state CNT=3 and MOD=φ. The result of succeeding identification CNT≧2? being YES, the controller memorizes the data bits of a number equal to the content of CNT (3 bits in this case) in succession from CREG 142 to REG 147. This function is achieved by repeating the execution of the Read Bit sub-routine to memorize the content of D from the lowermost bit of REG 147 by a number of times equal to the content of CNT 144.

In the foregoing manner the address data and the reminder data of the Wyle code shown in FIG. 2 are respectively stored in CNT 144 and REG 147, which is shown in FIG. 11D. The data stored in REG 147 in this case are 3 bits 94, 95 and 96 shown in FIG. 12C, which are memorized respectively in the positions 147c, 147b and 147a shown in FIG. 11D, while the remaining 13 bits from 147d to 147p remain in the $\phi$ state because of absence of input. The state of REG 147 after said data entry is shown in FIG. 11E.

Successively the controller 111 performs a calculation to determine the run length of the binary image signal. The calculation in this case will be:

$$REG = 6 + 1 + 2^3 = 15$$

The program then proceeds to the path 154 to rewrites LCNT 146 which becomes:

$$LCNT = -2048 + 15 = -2033$$

Then the controller investigates MOD to perform a processing for a black or white run.

If MOD = 1, the program proceeds to the path 155 to produce a black signal, and if MOD = $\phi$ the program proceeds to the path 156 to produce a white signal or a black signal to be inserted as featured in the present invention.

MOD being $\phi$ in this case, the program proceeds through the path 156 to investigate BRMOD, of which content is 1 if the previously processed image signal block is a white information. In this case BRMOD being 1 by the initial resetting, the program proceeds to the path 157, and then resets a flip-flop F1 (132) in FIG. 9 (hereinafter referred to as F1), said resetting being performed by a F1 reset signal 116-a supplied from the controller 111, decoder 121 and gate 116. The output of said F1 is connected to the input terminal of the line buffer 134 to provide the image signal which is to be stored in said line buffer. A $\phi$ output from F1 (being in reset state) represents a white signal.

Then the program writes the content of MOD into BRMOD and proceeds to the path 159, wherein the controller 111 loads the content of REG 147 into the 4-bit counter H123 and 8-bit counter L122. This function is performed by at first providing an output of 8 bits 147a–147h of REG 147 (FIG. 11D) to the SYSTEM OUTPUT terminal 139-a and then releasing a counter L load signal 120-a thereby writing the data into the counter L122, and successively by providing an output of 4 bits 147a–147l of the REG 147 (FIG. 11D) again to the SYSTEM OUTPUT terminal 139-a and releasing a counter load signal 119-a thereby writing the data into the counter H123. The above-mentioned procedure is conducted in two steps since the SYSTEM OUTPUT terminal is of 8-bit structure. In FIG. 11D, 147m to 147p are not used.

The count-down (CD) terminal of said counter L122 receives the clock pulse 128-a from the oscillator 131 through the AND gate 128. Said clock pulse 128-a is also supplied, through an OR gate 127, to the line buffer 134. Also the borrow (B) terminal of the counter L is connected to the CD terminal of the counter H123. The output of the B terminal of said counter H123 is supplied, through an inverter 125, to an OR gate 130 to be utilized as the F2 reset signal to be explained later.

In the above-mentioned composition, the controller 111 sets the flip-flop F2 (129) (hereinafter referred to as F2), by means of said F2 reset signal 117-a. Thus the clock pulses are supplied from the output 128-a of the AND gate 128 through the OR gate 127 to the line buffer 134, in synchronization with which the white information (F1 being in reset state) is recorded into the line buffer. At the same time the counters L122 and H123 start counting. Upon counting of 15 clock pulses from the REG 147, the number of said pulses being equal to the number loaded in said counters, there is generated a borrow signal 123-a to reset F2 thereby terminating the write-in of white information into the line buffer 134.

During the above operation, the controller 111 awaits the resetting of F2 while repeatedly passing through the paths 60 and 61. Upon completion of write-in of one block of image information into the line buffer 134 and succeeding resetting of F2, the program proceeds to the path 162. At this point the controller 111 investigates the state of F2 by opening the gate 124 by means of the F2 sense signal 121-b and taking in the F2 output signal 129-a from the SYSTEM INPUT terminal 140-a.

Successively the controller 111 investigates if LCNT = $\phi$ to judge if the regeneration of one line of image information is completed. LCNT being −2033 in this case, the program returns to the path 163.

Now there will be explained the second block W3 in FIG. 12A. Avoiding repeated explanation, the path sequence consists of:

163-150-164-151-153-154-156-158-157-159-(160-161)-162-163:

wherein the parentheses represent repetition. The black run inserting sub-routine to be conducted in the path 158 is shown in FIG. 13D. The path 158 is selected when there exist two consecutive white runs, indicating the elimination of a black run of 3-bit length at the transmitter side, and requiring the insertion of a black run of 3-bit length at the receiver side.

The process sequence of the succeeding third block W6 is:

163-150-164-150-164-151-152-154-156-158-159-(160-161)-162-163.

The process sequence of the succeeding fourth block B9 is:

163-150-164-150-164-151-152-154-155-159-(160-161)-162-163.

The process sequence of the succeeding fifth block W3 is:

163-150-164-151-153-154-156-157-159-(160-161)-162-163.

In this case, since BRMOD = 1 as the preceding run is a black run, the program does not proceed to the path 158 but to the path 157 so that no insertion of black run is conducted.

Figure 9A:
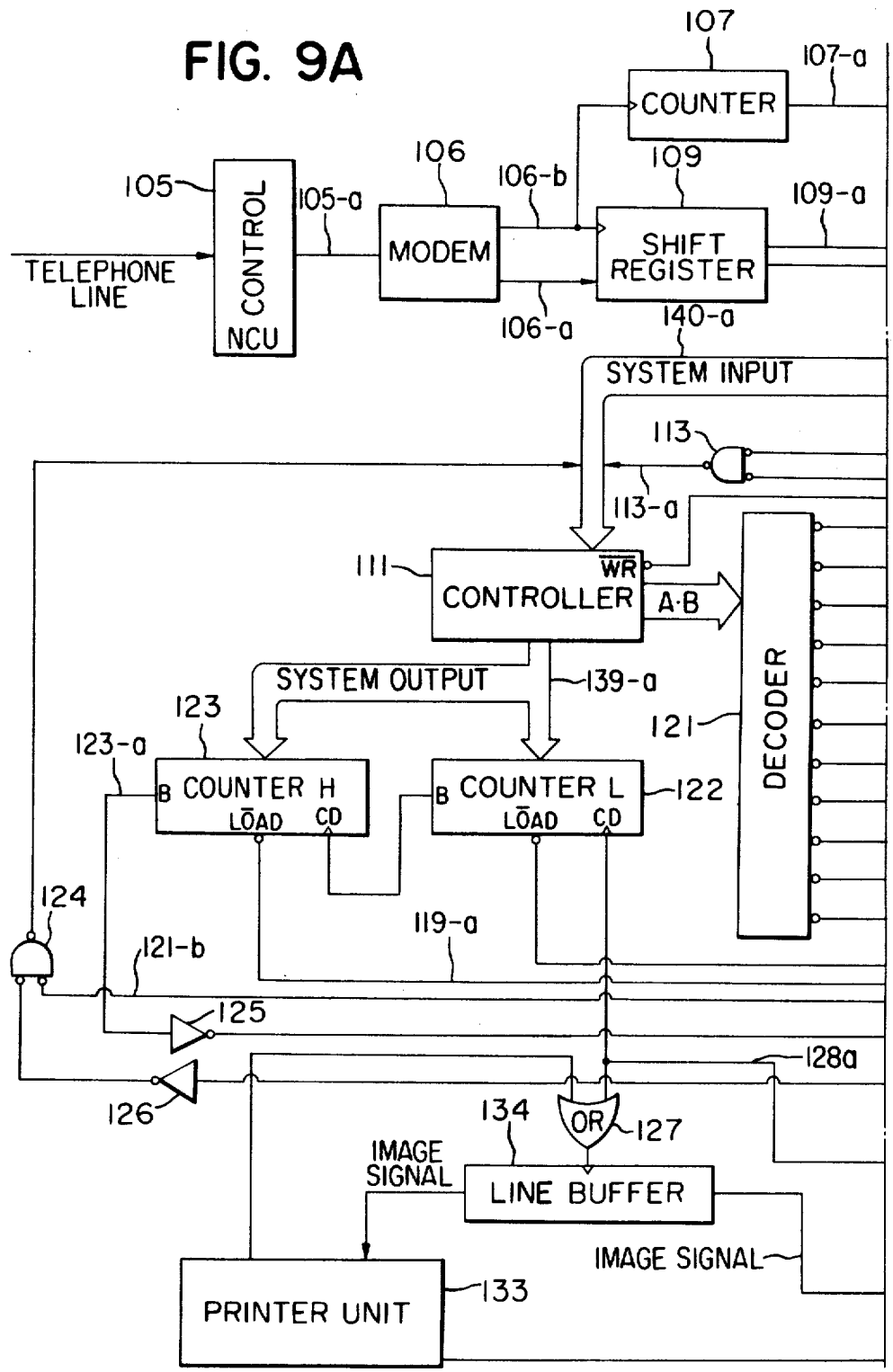
FIG. 9 is a circuit drawing of the facsimile apparatus of the present invention.

In this manner it is rendered possible to process the binary facsimile signal of one line shown in FIG. 12A and to similarly process all the signals transmitted through the telephone line shown in FIG. 9, and a received image is therefore obtained by the printer unit shown in FIG. 9.

As explained in the foregoing, the facsimile apparatus of the present invention is capable, in case of processing the information in an original composed of letters and symbols having an approximately constant line-width, of forming a received image by attaching an arbitrary signal to the transmission signal band compressed by eliminating redundancy from said information, and thus is capable of recording said letters and symbols rapidly by receiving said transmission signal with reduced transmission time.

What we claim is:

1. A facsimile apparatus comprising:
   reader means for converting contrast signals, representative of image information recorded on an original and obtained by scanning of the original, into a two-level binary image signal sequence wherein first and second levels of binary image signals alternately appear corresponding to the contrast signals;
   compression processing means for processing the binary image signal sequence from said reader means in such manner that a first level binary image signal having a number of bits "R", which is less than a predetermined value "N", is treated as a reference signal; first level binary image signals having a number of bits "X", less than "N" and different from "R", are identified; quantities of (X-R) bit(s) related to first level binary image signals having the number of bits "X" are converted into second level binary image signals and added to either one of the adjacent second level binary image signals between which the first level binary image signal having the number of bits "X" is located; and all first level binary signals having the number of bits "R" and the remainder bits {X-(X-R)} are eliminated from said two levels of binary image signals; and
   transmitting means for transmitting the signals from said compression processing means.

2. A facsimile apparatus according to claim 1 wherein said two levels of binary image signals are coded in a digital form, and there are provided identifying signals, for each of the coded signals, for discriminating between the first level and second level coded signals.

3. A facsimile apparatus comprising:
   reader means for converting contrast signals, representative of image information recorded on an original and obtained by scanning of the original, into a two level binary image signal sequence wherein first and second levels of binary image signals alternately appear corresponding to the contrast signals;
   memory means for storing the two levels of binary image signals from said reader means for each scanning time of one line;
   counting means for counting the two levels of binary image signals to be stored in said memory means, said counting means producing an output signal when it counts a predetermined quantity of the binary image signals included in a scanning line; and
   compression processing means coupled to said memory means and said counting means for processing each scanning line of the binary image signal sequence from said reader means in such manner that a first level of binary image signal having a number of bits "R", less than a predetermined value "N", is treated as a reference signal; first level binary image signals having a number of bits "X", less than "N" and different from "R", are identified; quantities of (X-R) bit(s) related to first level image signals having the number of bits "X" are converted into second level binary image signals and added to either one of the adjacent second level binary image signals between which the first level binary image signal having the number of bits "X" is located; and all first level binary signals having the number of bits "R" and the remainder bits {X-(X-R)} are eliminated from said two levels of binary image signals.

4. A facsimile apparatus according to claim 3 further comprising a transmitting means for transmitting the signals from said compression processing means.

5. A facsimile apparatus according to claim 3 wherein said two levels of binary image signals are coded in a digital form, and there are provided identifying signals, for the coded signals, for discriminating between the first level and second level code signals.

6. A facsimile apparatus comprising:
   receiving means for receiving an image signal sequence produced from a two level binary image signal sequence wherein first and second levels of binary image signals alternately appear corresponding to contrast signals which are obtained by scanning of an original, said image signal sequence being provided with identifying signals for identifying between the first level and the second level of binary image signals, and being coded in such a manner that a first level binary image signal having a number of bits "R", less than a predetermined value "N", is treated as a reference signal; first level binary image signals having a number of bits "X", less than "N" and different from "R", are identified; quantites of (X-R) bit(s) related to first level binary image signals having the number of bits "X" are converted into second level binary image signals and added to either one of the adjacent second level binary image signals between which the first level binary image signal having the number of bits "X" is located; and all first level binary signals having the number of bits "R" and the remainder bits {X-(X-R)} are eliminated from said two levels of binary image signals; and
   decoding means for decoding the said received image signal sequence by interposing signals having the number of bits "R" between each set of successive second level signals.

7. A facsimile apparatus according to claim 6 further comprising recording means for recording an image in accordance with the decoded image signals from said decoding means.

8. A facsimile apparatus according to claim 6 further comprising storage means for storing the decoded image signals from said decoding means, and counting means for counting a quantity of decoded image signals stored in said storage means.

9. A facsimile apparatus according to claim 8 further comprising recording means for recording an image in accordance with the decoded image signals stored in said storage means, and wherein said storage means provides the decoded image signals as output signals to said recording means when said counting means counts decoded image signals.

* * * * *